(12) United States Patent
Gibbins

(10) Patent No.: US 8,333,439 B2
(45) Date of Patent: Dec. 18, 2012

(54) REPLACEMENT PART ASSEMBLY

(76) Inventor: John Gibbins, Sparks, NV (US)

( * ) Notice: Subject to any disclaimer, the term of this patent is extended or adjusted under 35 U.S.C. 154(b) by 0 days.

(21) Appl. No.: 12/766,945

(22) Filed: Apr. 26, 2010

(65) Prior Publication Data

US 2010/0247242 A1 Sep. 30, 2010

Related U.S. Application Data

(63) Continuation of application No. 11/458,693, filed on Jul. 20, 2006, now abandoned, which is a continuation-in-part of application No. 10/506,351, filed on Mar. 19, 2003, now abandoned.

(51) Int. Cl.
*B60B 15/02* (2006.01)
*E01C 19/26* (2006.01)
*A01B 33/00* (2006.01)

(52) U.S. Cl. ...... 301/44.1; 301/44.3; 404/121; 404/124; 172/122

(58) Field of Classification Search ............ 301/43, 301/44.1, 44.3; 404/121, 124; 172/122, 172/554
See application file for complete search history.

(56) References Cited

U.S. PATENT DOCUMENTS

| | | |
|---|---|---|
| 990,846 A | 5/1911 | Crandall |
| 1,216,290 A | 2/1917 | Dickson |
| 1,406,562 A | 2/1922 | Hruby |
| 1,425,258 A | 8/1922 | Hoke |
| 1,897,998 A | 6/1931 | McCord |
| 2,055,265 A | 9/1936 | Swigert |
| 2,092,311 A | 9/1937 | Hosmer |
| 2,113,420 A | 4/1938 | Younie |
| 2,206,349 A | 7/1940 | Finley |
| 2,435,847 A | 2/1948 | Robertson |
| 2,901,845 A | 9/1959 | Whisler |
| 2,904,908 A | 9/1959 | Ratkowski |
| 2,904,909 A | 9/1959 | Ratkowski |
| 2,936,538 A | 5/1960 | Opsahl |
| 2,951,300 A | 9/1960 | Ratkowski |
| 3,022,586 A | 2/1962 | Towne |
| 3,025,619 A | 3/1962 | Towne |
| 3,061,021 A | 10/1962 | Shader |
| 3,106,256 A | 10/1963 | McBride |
| 3,155,428 A | 11/1964 | Proctor |
| 3,175,314 A | 3/1965 | Williamson |

(Continued)

FOREIGN PATENT DOCUMENTS

EP 0172019 2/1986

(Continued)

*Primary Examiner* — Jason Bellinger
(74) *Attorney, Agent, or Firm* — Galbreath Law Offices, P.C.; John A. Galbreath

(57) ABSTRACT

The present invention relates to a cleat assembly for a compactor wheel. The cleat assembly includes an adaptor for fastening to the compactor wheel. A cleat defines a recess in which the adaptor is receivable. A spring plate fastener has a strip of spring plate material, with opposed feet and at least one apex interposed between the feet. The adaptor and the cleat are shaped so that the spring can be received through both the cleat and the adaptor such the spring fastener is held in compression between the cleat and the adaptor, with the feet bearing against the cleat and the, or each, apex bearing against the adaptor to fasten the cleat to the adaptor. The cleat defines a pair of opposed apertures and the adaptor defines a guide formation, the apertures and the guide formation being configured to permit the spring plate to be inserted into engagement with the cleat and the adaptor from one of the apertures.

9 Claims, 29 Drawing Sheets

U.S. PATENT DOCUMENTS

| | | |
|---|---|---|
| 3,252,391 A | 5/1966 | Dils |
| 3,256,622 A | 6/1966 | Hostetter |
| 3,400,476 A | 9/1968 | Petersen |
| 3,751,834 A | 8/1973 | Petersen |
| 3,822,957 A | 7/1974 | Caron |
| 3,826,024 A | 7/1974 | Petersen |
| 3,832,077 A | 8/1974 | Von Mehren |
| 3,914,885 A | 10/1975 | Moreau |
| 3,922,106 A | 11/1975 | Caron |
| 3,990,162 A | 11/1976 | Heinold |
| 4,050,172 A | 9/1977 | Petersen |
| 4,066,375 A | 1/1978 | Caron |
| 4,187,035 A | 2/1980 | Colburn |
| 4,192,089 A | 3/1980 | Schwappach |
| 4,342,166 A | 8/1982 | Johnson |
| 4,367,602 A | 1/1983 | Petersen |
| 4,602,445 A | 7/1986 | Nilsson |
| 4,668,122 A | 5/1987 | Riddle |
| 4,716,668 A | 1/1988 | Hahn |
| 4,823,487 A | 4/1989 | Robinson |
| 4,919,566 A | 4/1990 | Caron |
| 5,068,986 A | 12/1991 | Jones |
| 5,205,057 A | 4/1993 | Garman |
| 5,217,321 A | 6/1993 | Corcoran |
| 5,217,322 A | 6/1993 | Corcoran |
| 5,219,256 A | 6/1993 | Ford |
| 5,272,824 A | 12/1993 | Cornelius |
| 5,469,648 A | 11/1995 | Jones et al. |
| 5,509,696 A | 4/1996 | Smith |
| 5,724,756 A | 3/1998 | Gale |
| 5,795,097 A | 8/1998 | Caron |
| 5,937,549 A | 8/1999 | Bender |
| 6,085,448 A | 7/2000 | Gale |
| 6,095,717 A | 8/2000 | Kaldenberg |
| 6,240,663 B1 | 6/2001 | Robinson |
| 6,682,262 B2 | 1/2004 | Caron |
| 6,991,401 B1 | 1/2006 | Caron |
| 7,108,452 B2 | 9/2006 | Caron |
| 2002/0114667 A1 | 8/2002 | Kaldenberg |

FOREIGN PATENT DOCUMENTS

| | | |
|---|---|---|
| EP | 195107 | 9/1986 |
| GB | 2250932 | 6/1992 |
| WO | WO9219822 | 11/1992 |
| WO | WO9418401 | 8/1994 |
| WO | WO9628613 | 9/1996 |
| WO | WO9830760 | 7/1998 |
| WO | WO0186075 | 11/2001 |
| WO | WO 03/078738 | 9/2003 |

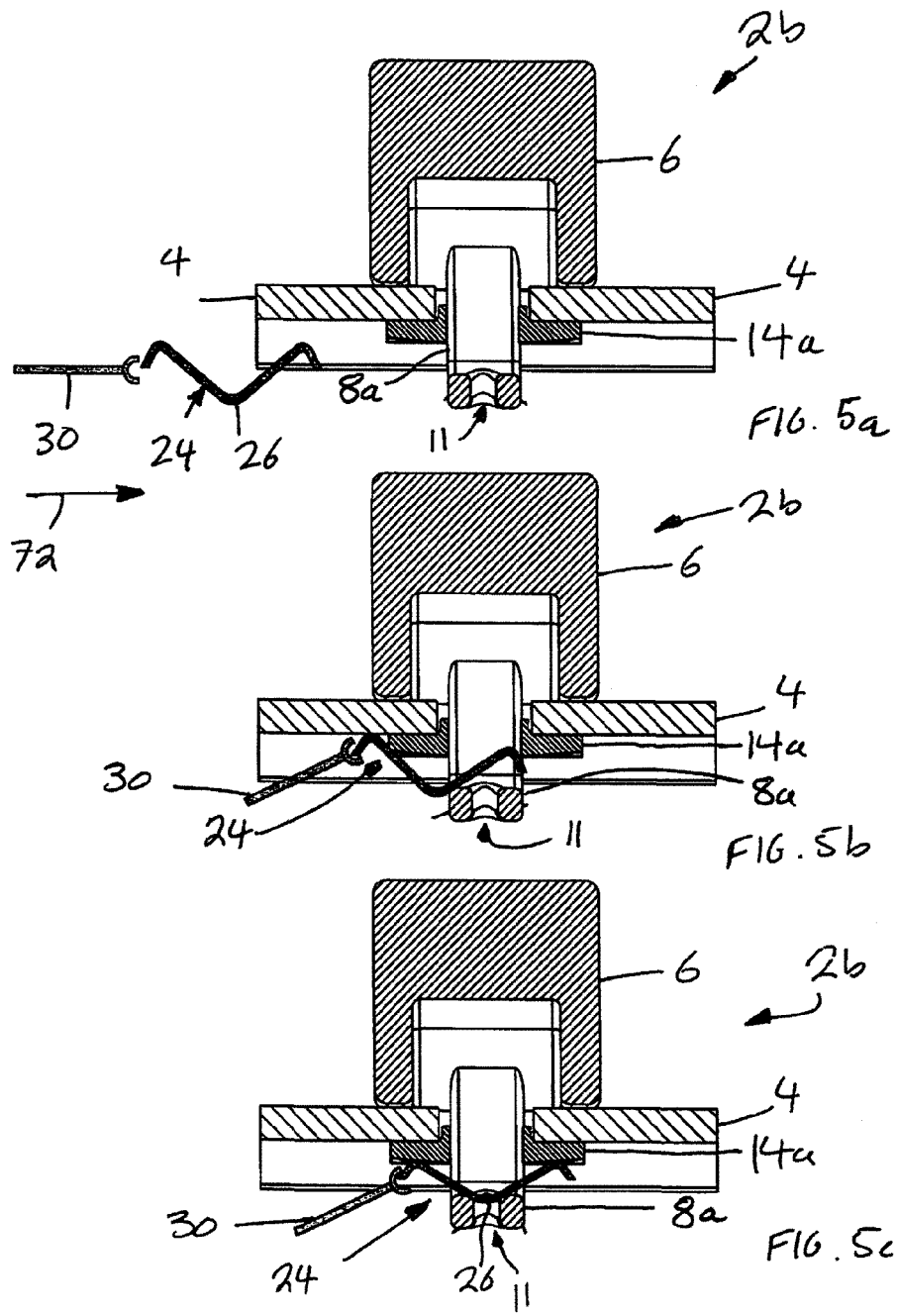

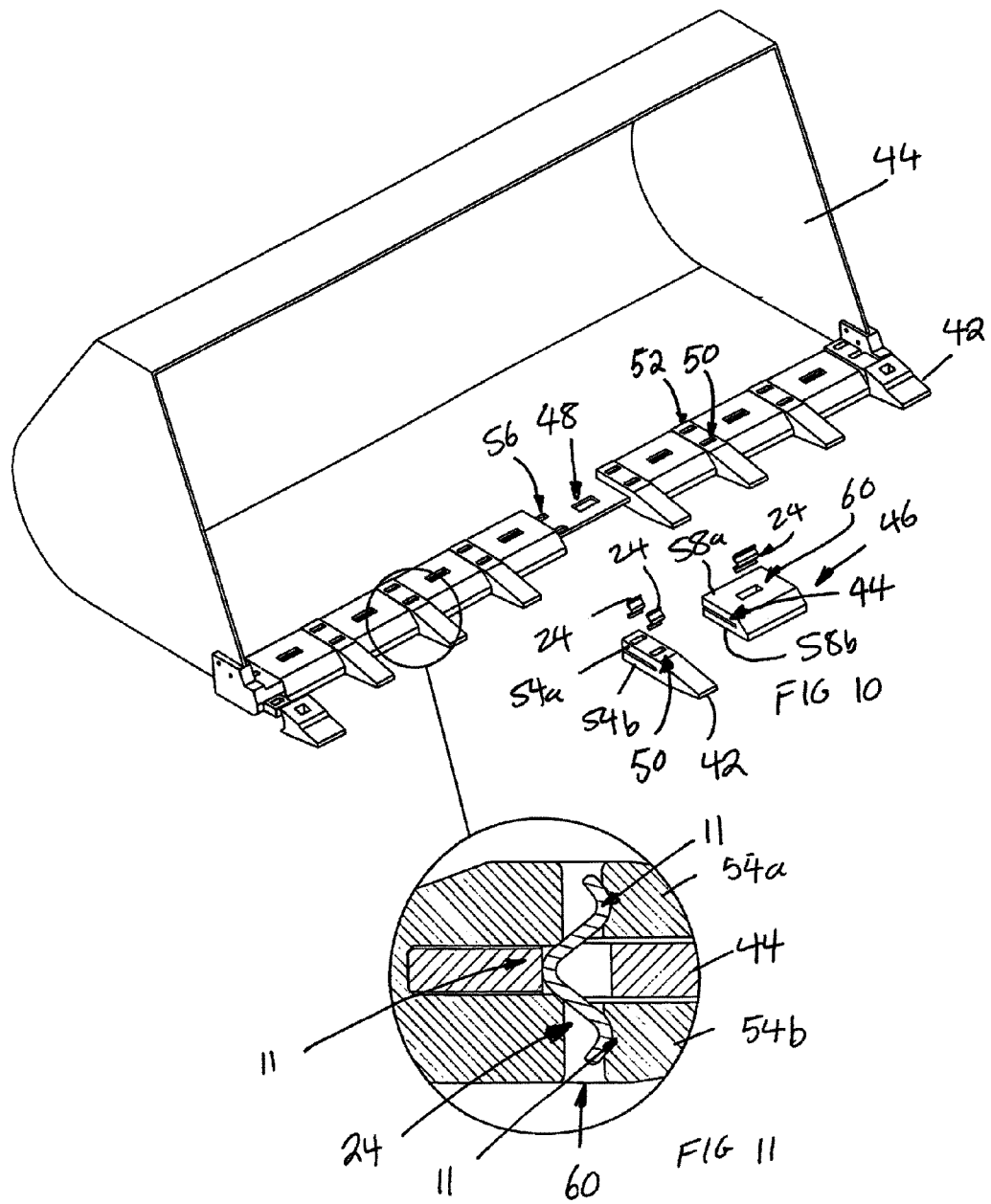

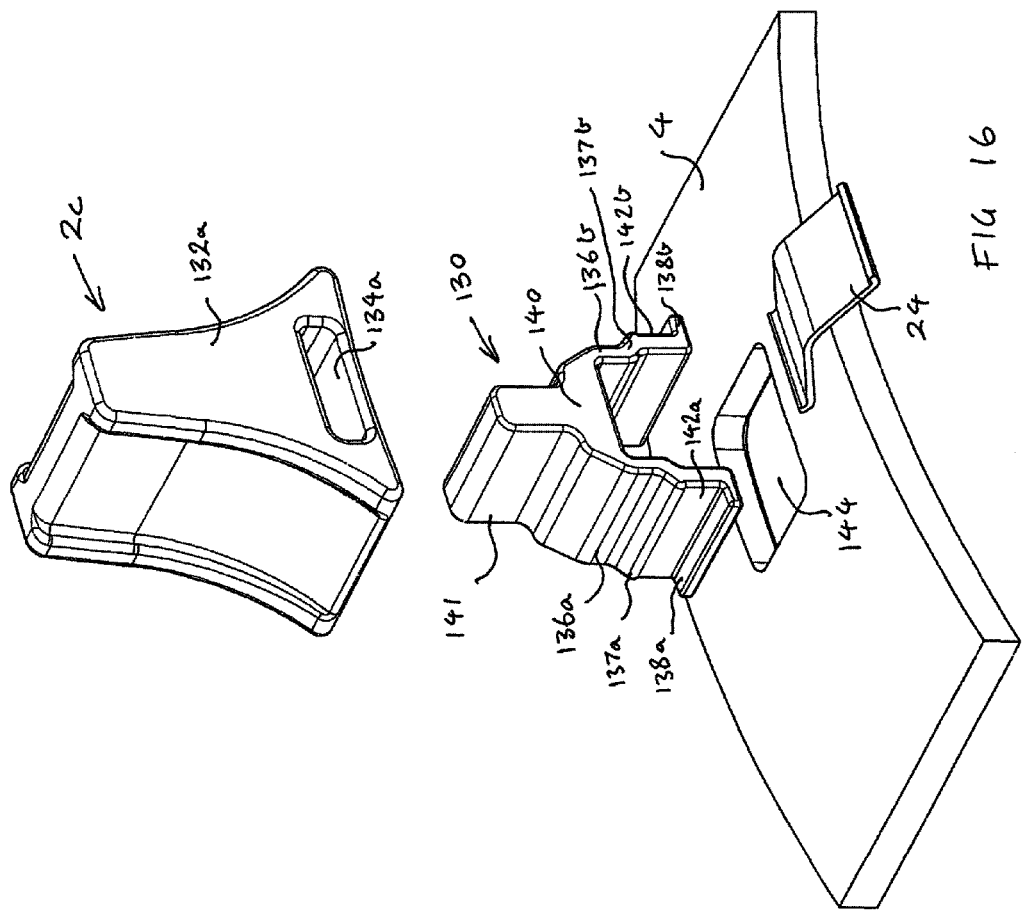

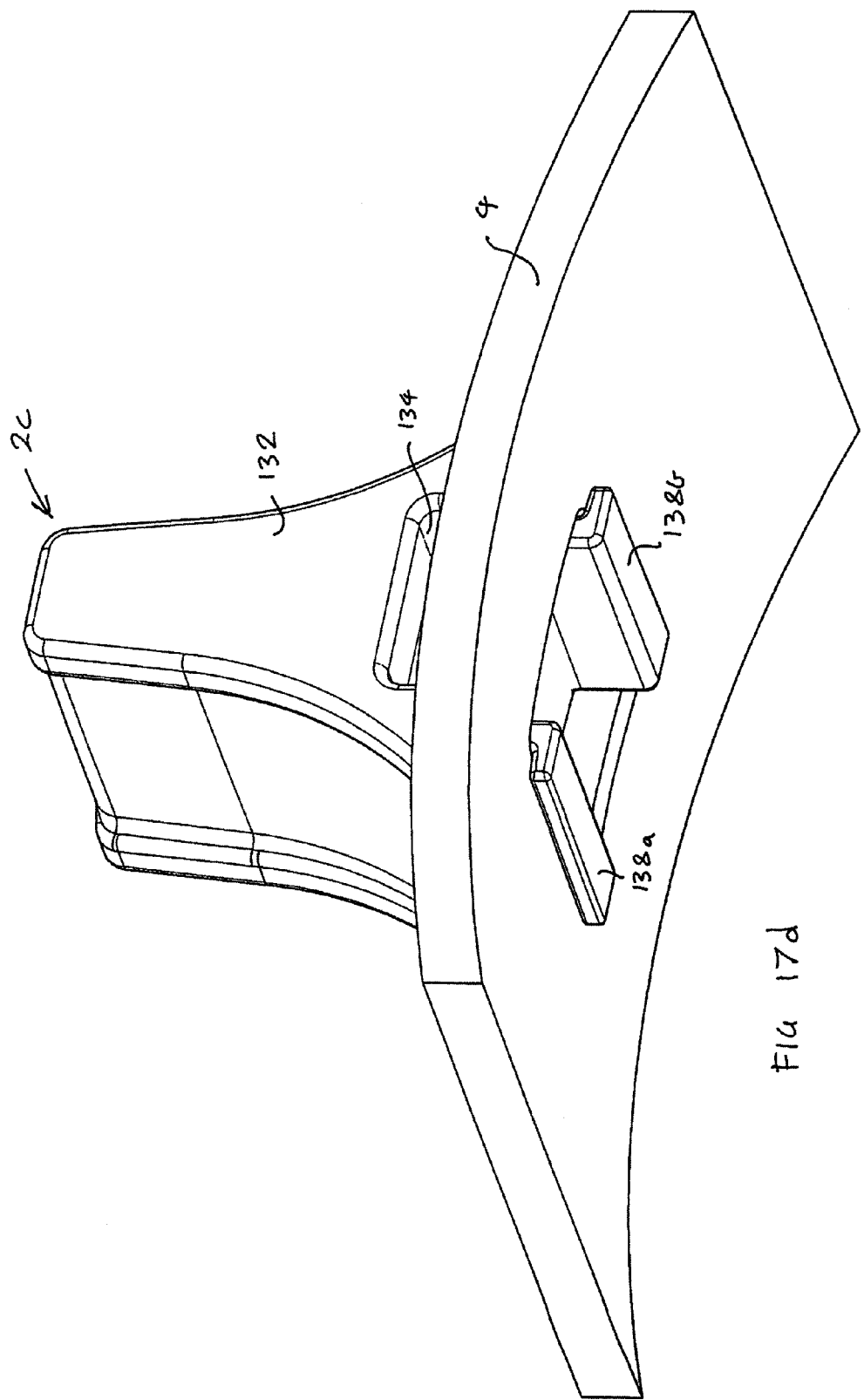

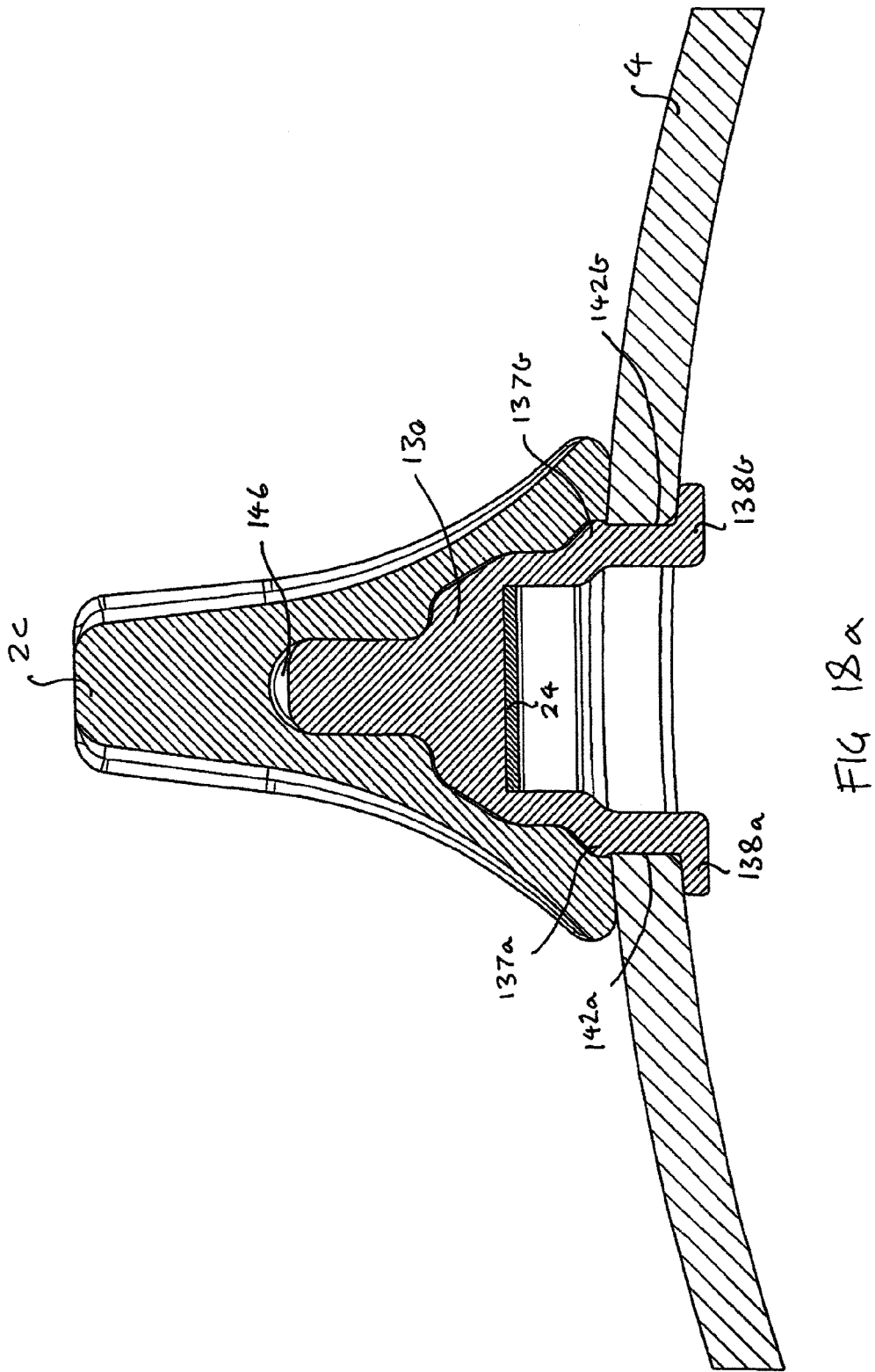

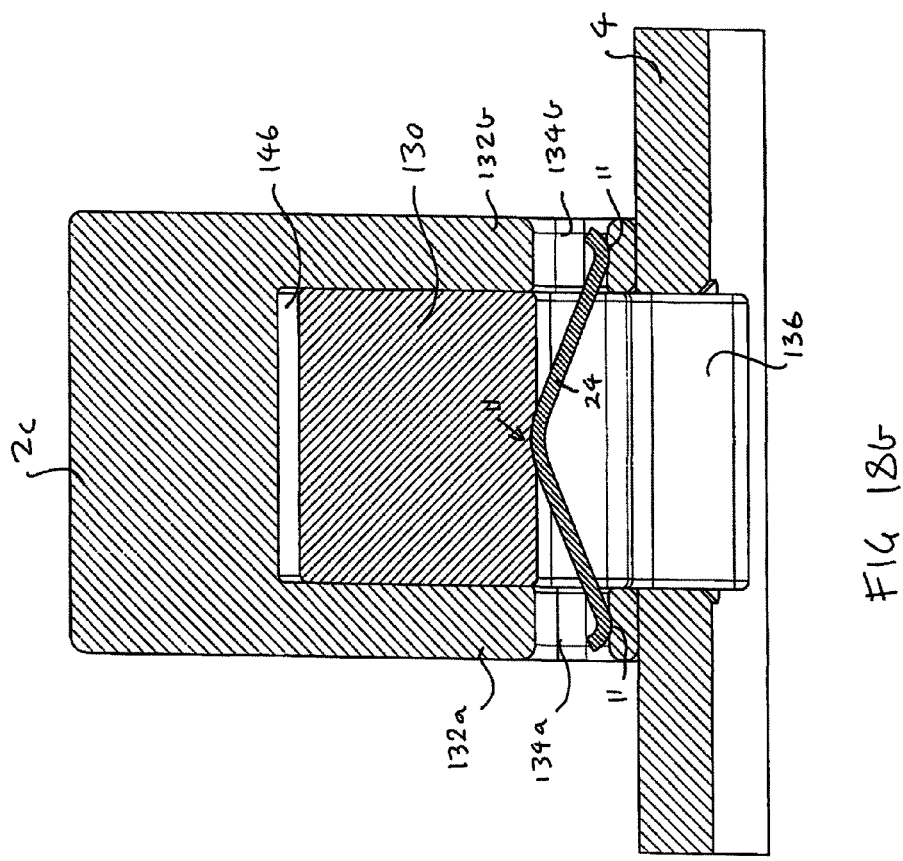

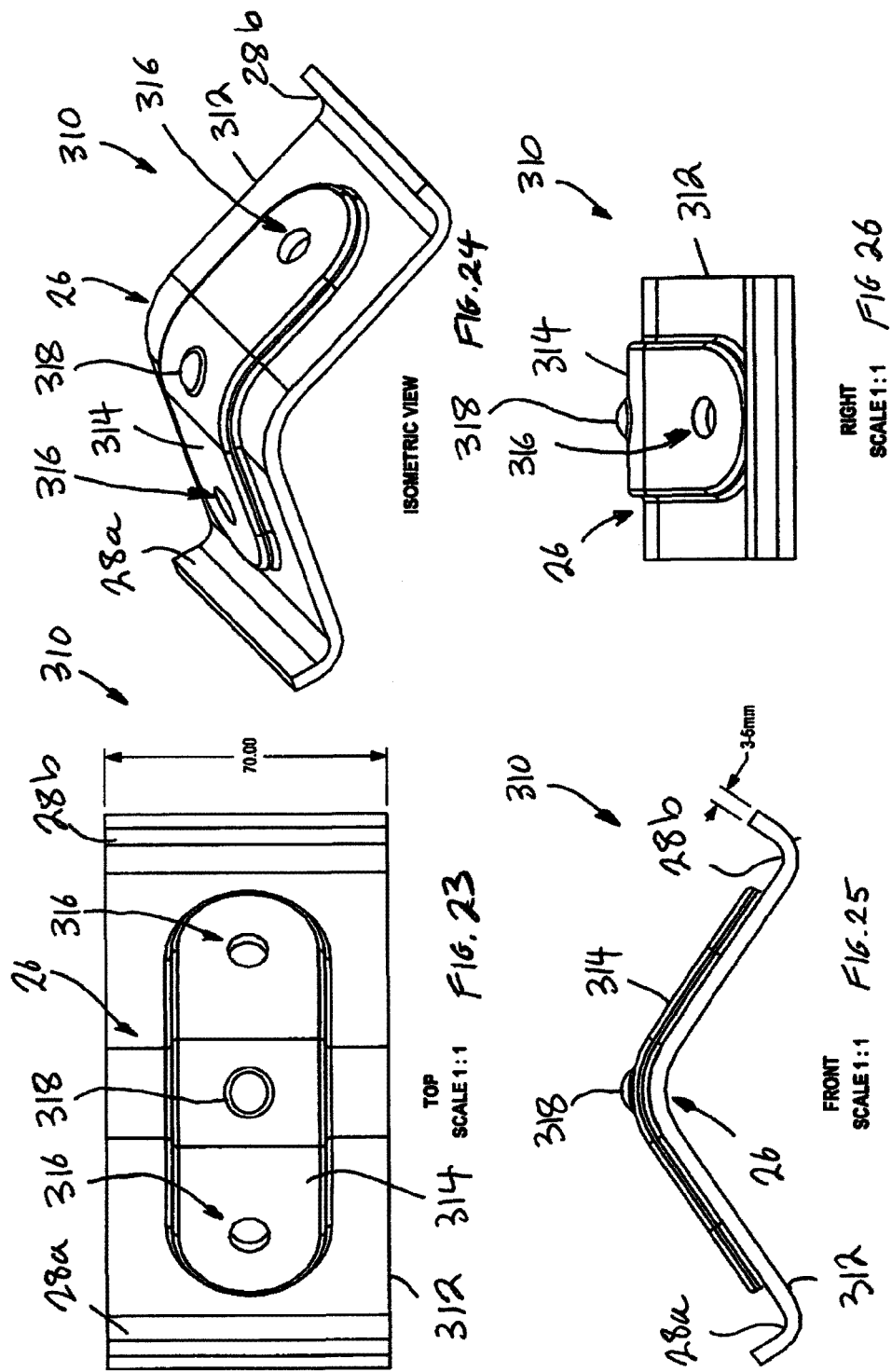

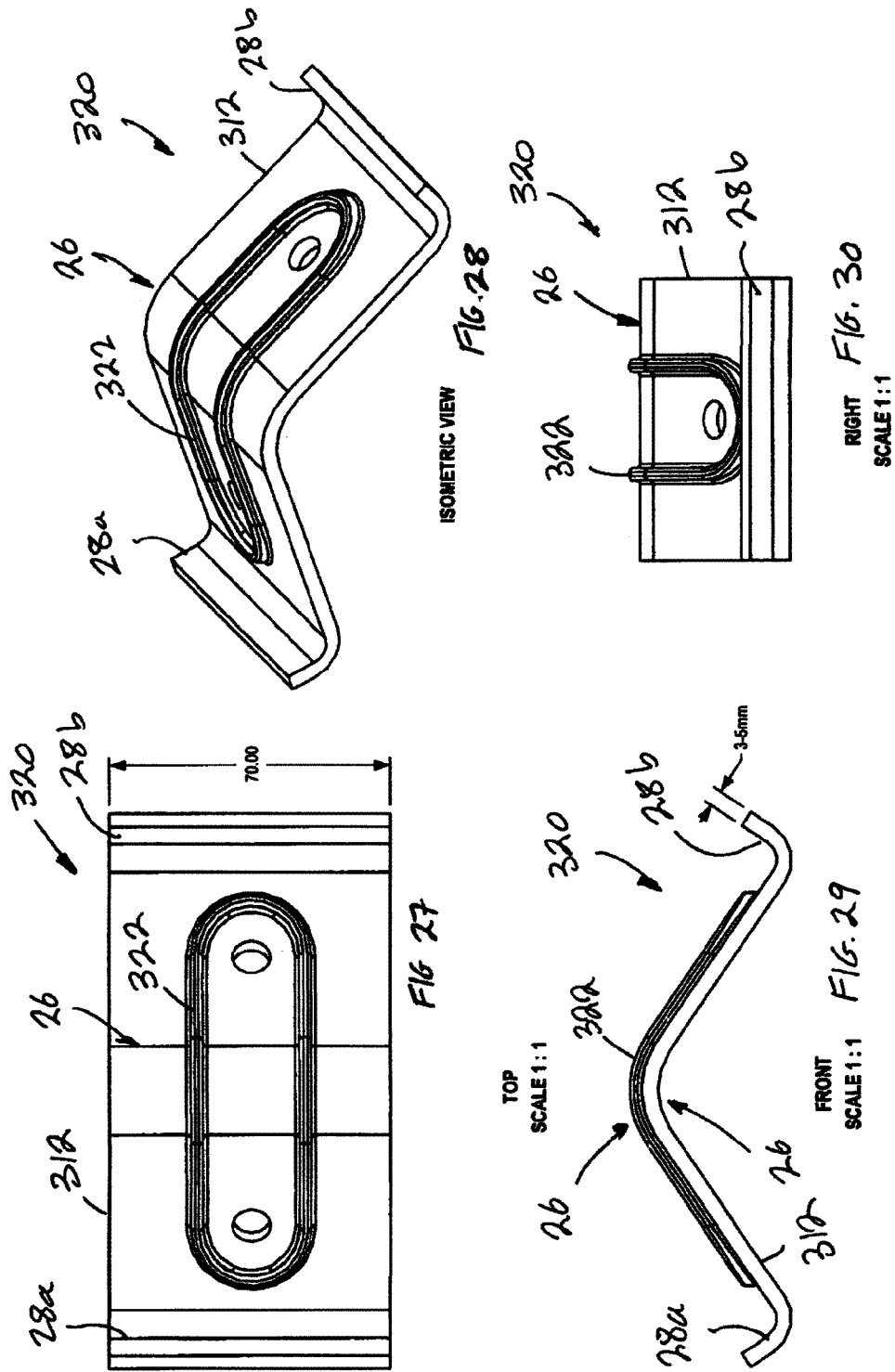

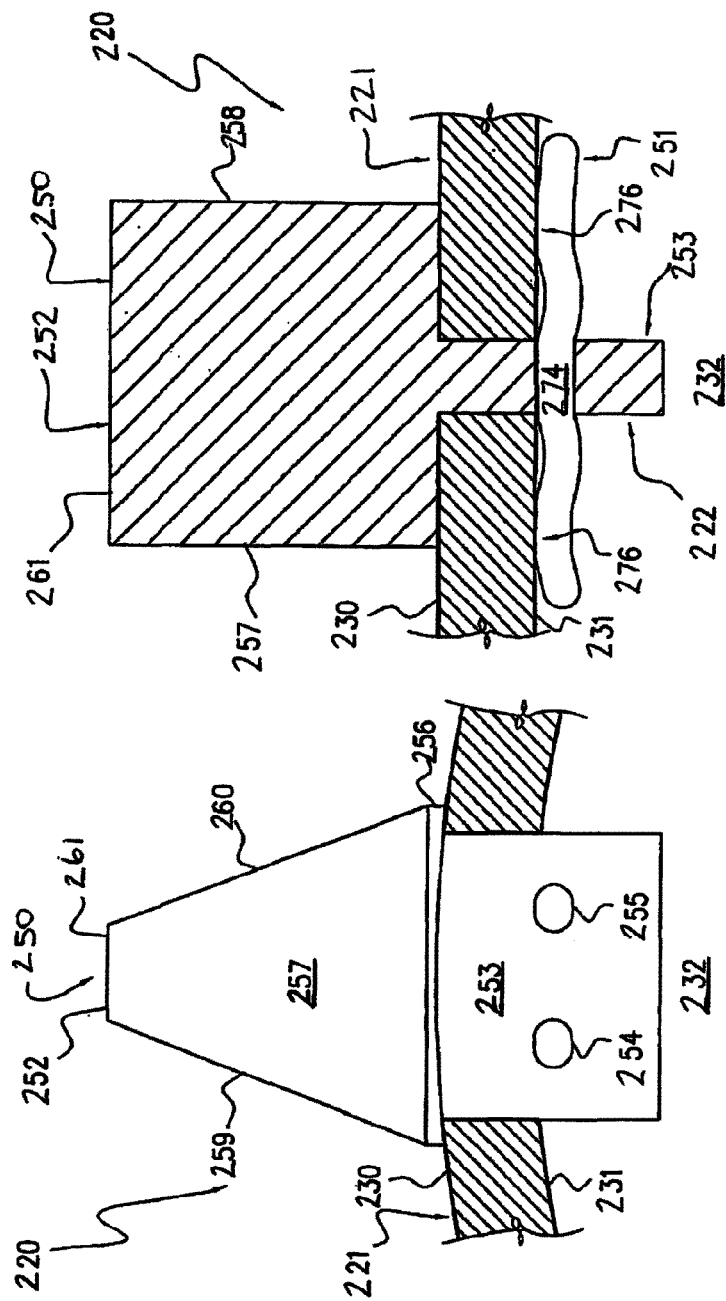

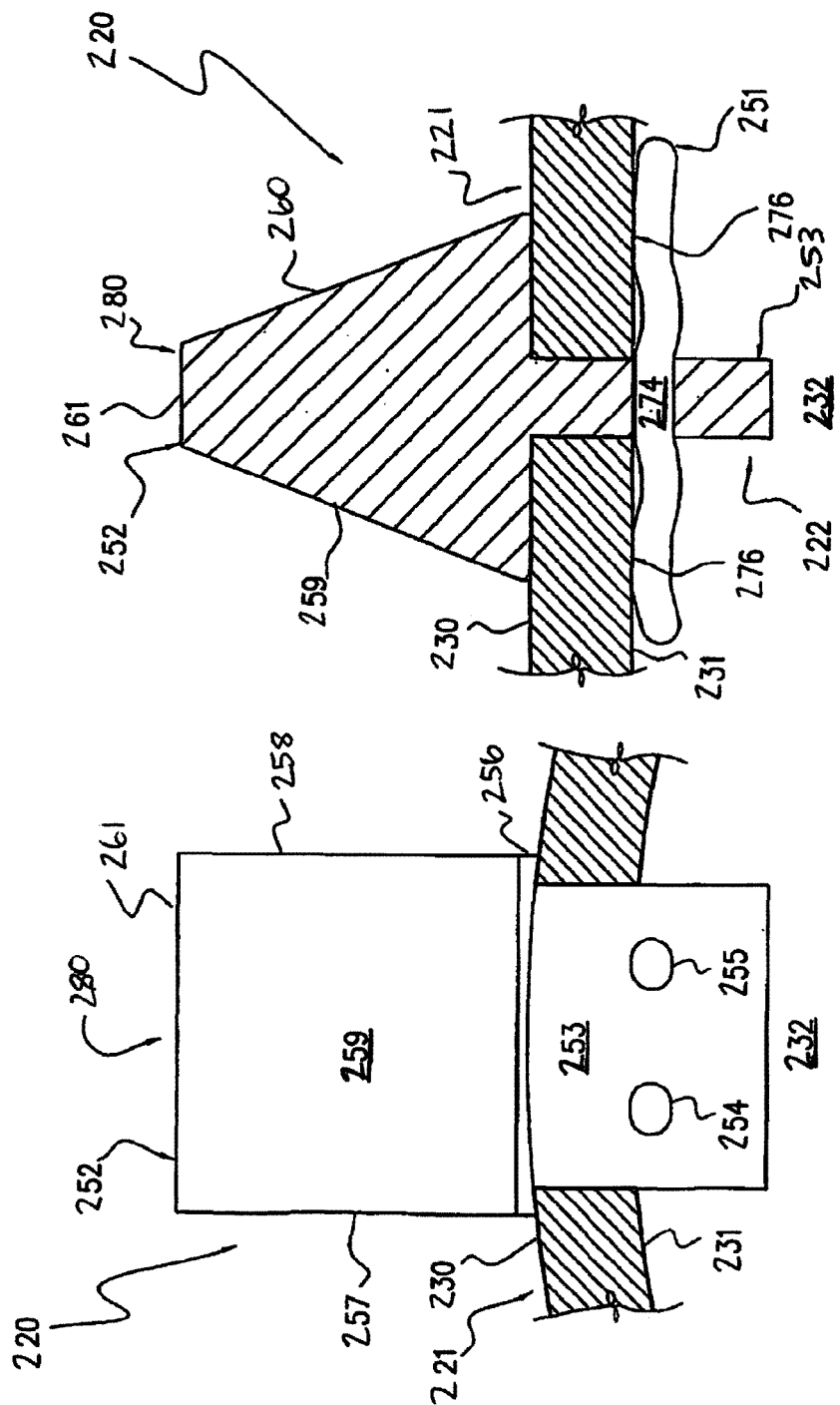

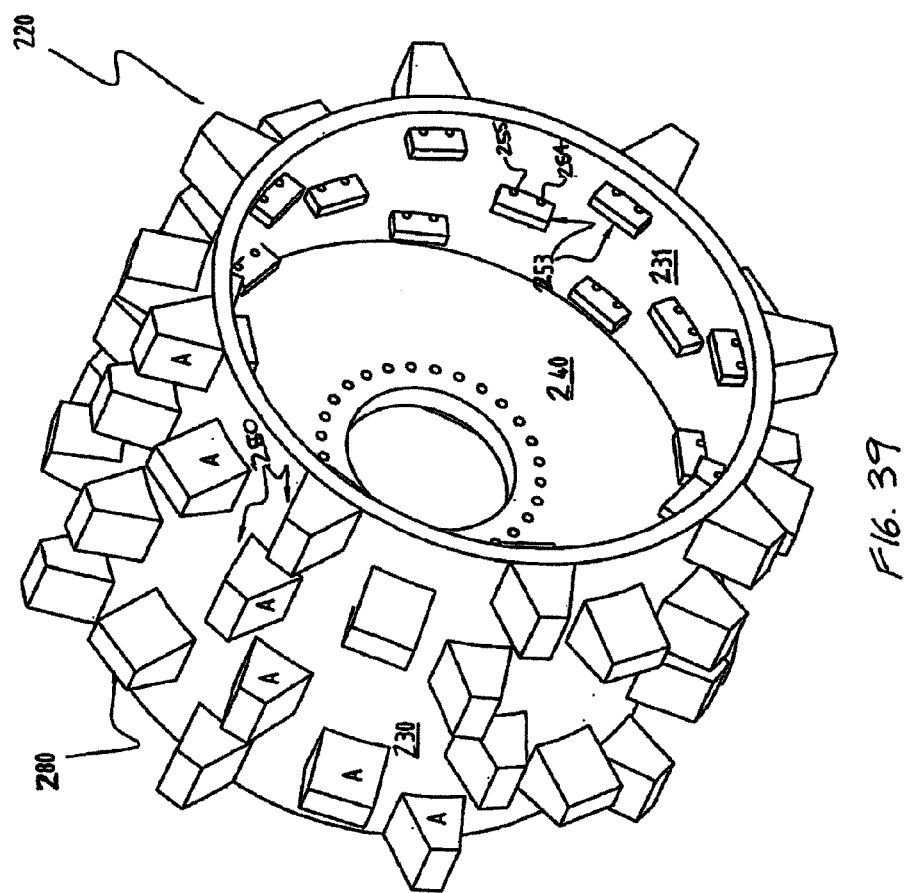

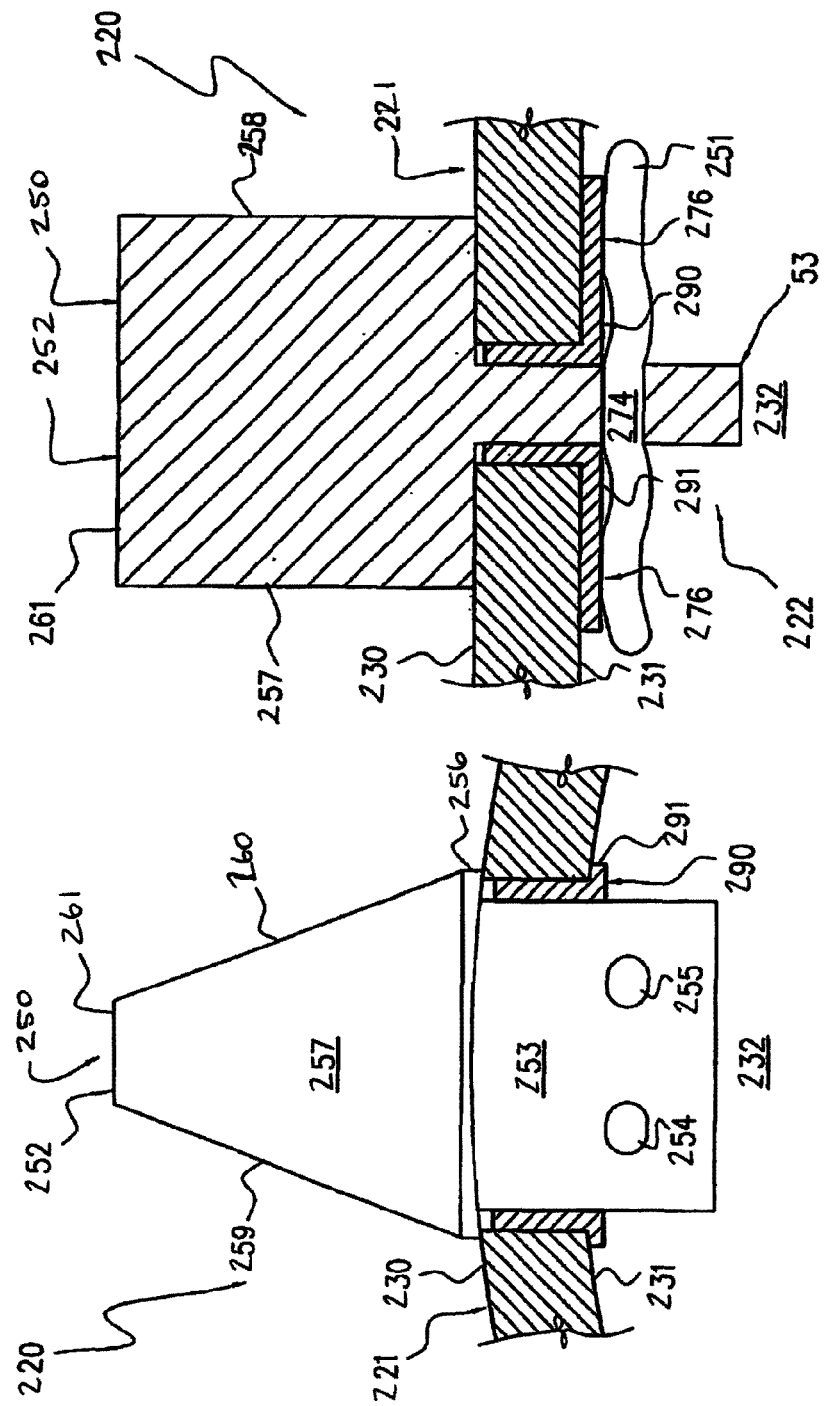

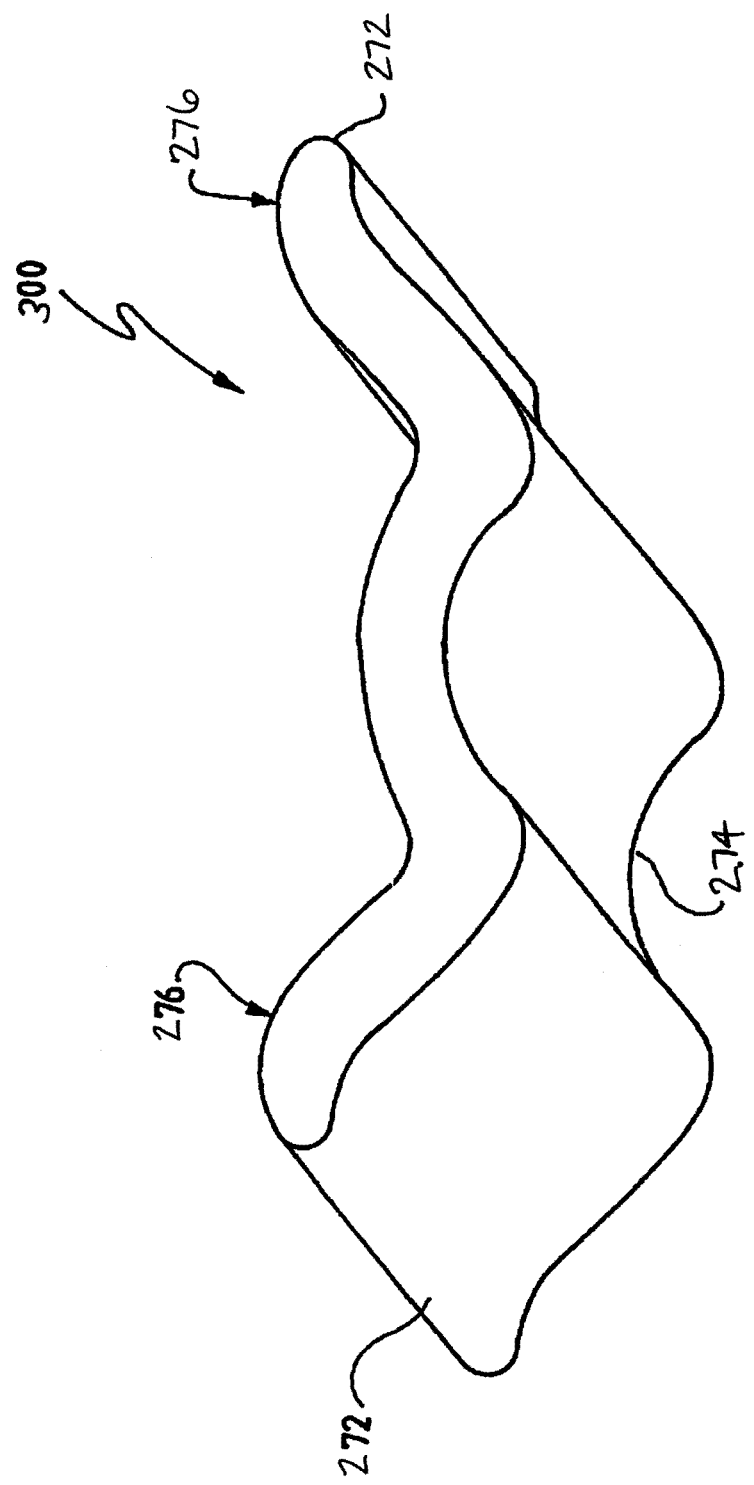

REPLACEMENT PART ASSEMBLY

This Application is a Continuation of U.S. patent application Ser. No. 11/458,693 filed on Jul. 20, 2006 and now abandoned, which is itself a Continuation-in-Part Application of U.S. patent application Ser. No. 10/506,351 filed on Mar. 19, 2003 and also now abandoned. Priority is claimed to both of these applications, and both applications are herewith expressly incorporated by reference.

TECHNICAL FIELD

The present invention generally relates to compaction wheels. In particular, the invention relates to compaction wheels of the type which include a rim and a plurality of cleats secured thereto.

The invention will be described by way of example with reference to compaction wheels for landfill and soil compactors. However, it should be appreciated that this is by way of example only and that the invention may be used in conjunction with other types of compaction wheels.

The present invention also relates to a replacement part assembly which is suitable for use with machinery having replaceable parts. The present invention has particular, although not exclusive, application in heavy industry such as the construction, earth moving, mining, and agricultural industries.

BACKGROUND

Industrial machinery parts are prone to wear over time. It is then necessary to replace the worn parts to keep the machinery operating in optimum condition.

As a case in point, excavation machines such as back hoes include a bucket to which a plurality of digging teeth is fastened. The teeth are either fastened directly or with an adaptor. In use, a great deal of pressure is exerted on the teeth, as well as the fastening arrangement which holds them to the bucket. The teeth and the fastening arrangement become fatigued over time which may cause the teeth or the adaptors which hold them in place to loosen, fall off or break. Undesirably, the teeth may become dislodged from the bucket.

The teeth are usually replaceable and are typically welded, bolted or pinned to the bucket or an adaptor. Any lost, worn or broken teeth may be replaced by unbolting the broken tooth and reattaching the new tooth using the same bolts. This process can be quite expensive and time-consuming, and may be further complicated if the fastened parts are rusted, seized or welded.

It is an object of the present invention to provide an improved arrangement for replacing machinery parts.

Definitions

In this specification, the phrase "replacement part" and derivatives thereof is to be understood as meaning a part of industrial machinery that is generally replaced after a certain amount of work done by that part. Conversely, the phrase "fixed part" and derivatives thereof is to be understood as meaning a part of industrial machinery that is usually only replaced or discarded if it has been damaged and is intended to have at least an undefined lifetime.

SUMMARY OF THE INVENTION

According to a first aspect of the present invention, there is provided a replacement part assembly for use in machinery, the replacement part assembly including:

a replacement part for operative engagement with a fixed part; and a resilient fastener defining an apex to facilitate the operative engagement of the replacement part with the fixed part.

One or both of the replacement part and the fixed part may define a cradle for receiving the apex of the resilient fastener. Furthermore, an intermediate component may define the cradle.

In one embodiment, the apex may include an arcuate surface. Alternatively, the apex may be pointed.

The replacement part assembly may further include a sacrificial part that is receivable between the replacement part and the fixed part.

The resilient fastener may be formed from a spring plate. The resilient fastener may be generally sinusoidal in shape. The resilient fastener may be formed so that the apex is a peak or trough and is interposed between a pair of partially truncated peaks or troughs that define a pair of arcuate feet located on either side of the apex. It will be appreciated that this greatly facilitates fabrication in that the spring plate can be easily cut from larger profile stamped spring steel sheets having a sinusoidal profile.

In a first embodiment, the replacement part may be a cleat for fastening to a compactor wheel. The cleat may include a tip for engaging the ground and a tail for extending through an opening in the compactor wheel. The tail may define a passage into which the fastener is inserted in use. A cradle may be defined in the passage to engage the apex of the fastener and thus retain the fastener in the passage. The tail may include a pair of parallel arms which define the passage or, alternatively, may be a unitary structure.

The sacrificial part may include a sleeve that extends at least partially through the opening of the compactor wheel. The tail may pass through the sleeve. The sacrificial part may include a plate having an aperture. The sleeve may be a lip which extends from a periphery of the aperture. The plate may define a channel for receiving the resilient fastener.

The sacrificial part may be of a softer material than the wheel. Thus, the lip can wear instead of the opening of the compactor wheel becoming enlarged as a result of movement of the replacement part.

In a second embodiment, the fixed part may be a blade holder, cutter holder or moldboard for earth moving equipment, such as a bulldozer scraper, grader, excavator or back hoe. The replacement part may be a blade that is fastenable to the blade holder, cutter holder or moldboard. Thus, the replacement part assembly may further include a fastener having a head that bears against the blade and a shank that extends through complementary openings in the blade and the blade holder, cutter holder or moldboard. The shank may include a tail which defines the cradle.

The sacrificial part may include a sleeve that extends through the blade holder, cutter holder or moldboard. A base plate may be positioned on an inner end of the sleeve. The base plate may be interposed between the fastener and the blade holder, cutter holder or moldboard, in use. The sleeve functions in the same manner as the lip of the previous embodiment.

In a third embodiment, the replacement part may be a tooth and/or an adaptor for the bucket (i.e. scoop) of an earth moving, quarrying or mining machine. The tooth may include a pair of arms. A leading edge of the bucket may be receivable between the arms. Each arm may define an aperture for receiving the resilient fastener. The leading edge of the bucket may also define an aperture so that the apertures in the arms can be aligned with the aperture in the leading edge. Thus, the leading edge of the bucket may be provided with a series of apertures to correspond with the apertures in a series of teeth to be fastened to the leading edge of the bucket. Each arm may further define another aperture for receiving another resilient fastener. In this case, the leading edge of the bucket may define a series of aligned pairs of apertures.

In a fourth embodiment, the replacement part may be a spacer for spacing adjacent teeth of the bucket. The spacers may be fastened to the leading edge of the bucket in the same way as the teeth as described above. Alternatively, the replacement part may be a wear guard or cutting edge protector.

According to a second aspect of the present invention, there is provided a resilient fastener, the fastener being formed from a spring plate and including an arcuate or pointed apex.

According to a third aspect of the present invention, there is provided a cleat for a compactor wheel, the cleat including:
 a tip for engaging the ground; and
 a tail for extending through the compactor wheel and which defines a cradle for receiving the arcuate surface of a fastener.

According to a fourth aspect of the present invention, there is provided a tooth for the bucket of an excavator, the tooth including a pair of arms for receiving a leading edge of the bucket and each arm defining an aperture for receiving a resilient fastener.

According to a fifth aspect of the present invention, there is provided a spacer for spacing adjacent teeth of an earth moving machine bucket, the spacer including a pair of arms for receiving a leading edge of the bucket and each arm defining an aperture for receiving a resilient fastener.

According to a sixth aspect of the present invention, there is provided a sacrificial plate for a replacement part assembly, the sacrificial plate including a sleeve for receiving a replacement part, the sacrificial plate defining a channel for receiving a plate spring fastener.

According to a seventh aspect of the invention, there is provided a tool for fitting the fastener of the previous aspects of the invention, the tool including
 a body that defines proximal and distal portions that are spaced from each other, the distal portion defining an opening in which the fastener can be received; and
 a displacement mechanism engaged with the proximal portion, configured to bear against the fastener and operable to drive the fastener into engagement with the fixed and replacement parts.

The displacement mechanism may include a power screw threaded through the proximal arm and a bearing member mounted on a distal end of the power screw. The bearing member may be shaped securely to engage the fastener.

A proximal end of the power screw may be configured to engage a suitable apparatus such as an impact wrench or air chisel.

According to an eighth aspect of the invention, there is provided a compactor wheel assembly, the compactor wheel assembly including:
 a compactor wheel;
 an adaptor that can be fastened to the compactor wheel;
 a cleat that can be engaged with the adaptor; and
 a resilient fastener that defines an apex and that can be engaged with the adaptor and the cleat to fasten the cleat to the compactor wheel.

The adaptor may include:
 a body for being received in the cleat; and
 a pair of resilient legs which extend from the body and for extending through the compactor wheel, each leg defining a trough for retaining the adaptor in engagement with the compactor wheel.

The adaptor may further include a guide located between the legs and for guiding the resilient fastener during fastening. The guide may include a pair of opposed ledges along which the fastener can slide. Alternatively, the guide may include a shelf along which the fastener can slide.

The adaptor may be generally tapered in shape. The adaptor and cleat may be shaped so as to form a complementary fit.

The cleat may define a recess in which the adaptor can be received and may include a pair of flanks which each define an aperture for receiving the fastener.

The fastener may be held in compression between the cleat and the adaptor. The fastener may be located outside the compactor wheel.

In one embodiment, the compactor wheel assembly may include one or more welds which fasten the adaptor to the compactor wheel.

According to a ninth aspect of the invention, there is provided an adaptor for fastening a cleat to a compactor wheel, the adaptor including
 a body for being received in the cleat; and
 a pair of resilient legs which extend from the body and for extending through the compactor wheel, each leg defining a trough for retaining the adaptor in engagement with the compactor wheel.

According to a tenth aspect of the invention, there is provided a cleat for engaging with an adaptor and a fastener so as to be fastened with respect to a compactor wheel, the cleat defining a recess in which the adaptor can be received and including a pair of flanks which each define an aperture for receiving the fastener.

According to an eleventh aspect of the present invention there is provided a compaction wheel for landfill compactors, the compaction wheel including a rim and a plurality of cleats secured thereto with a plurality of spring clips, the rim including an exterior surface, an interior surface, and a plurality of cleat-receiving apertures extending therethrough between the exterior and interior surfaces, each of the cleats including a ground-engaging portion, a lug portion extending from the ground-engaging portion, and a clip-receiving aperture extending through the lug portion, each of the cleats being mountable on the rim such that the ground-engaging portions project from the exterior surface of the rim while the lug portions extend through the cleat-receiving apertures of the rim so that the clip-receiving apertures are situated adjacent the interior surface of the rim and lateral movement of the cleats relative to the rim is inhibited, the spring clips being adapted to secure the mounted cleats to the rim by engaging with the clip-receiving apertures and interacting with the rim and cleats such that the ground-engaging portions of the cleats are pulled towards the rim.

Preferably, the spring clips contact the interior surface of the rim.

The compaction wheel may include a plurality of sleeves each lining a respective cleat-receiving aperture. Also, each sleeve may include a flange portion abutting against the interior surface of the rim and a portion of a respective spring clip such that the spring clips force the sleeves and ground-engaging portions of the cleats towards each other. The sleeves may also be tack-welded to the rim.

The clip-receiving apertures may include chamfered or rounded edges defining the openings thereof.

In a preferred form, the lug portion of each cleat has a single clip-receiving aperture extending therethrough. Alternatively, the lug portion of each cleat may have a plurality of clip-receiving apertures extending therethrough.

Preferably, the spring clips are generally U-shaped and include a pair of arms which extend through respective clip-receiving apertures of the cleats. The spring clips may be adapted to extend through only a single clip-receiving aperture of the cleats.

The cleats may be mounted on the rim such that they extend in a plurality of substantially straight lines on the exterior surface of the rim. Alternatively, the cleats may be mounted on the rim such that they form a plurality of chevron or helix patterns on the exterior surface of the rim.

According to a twelfth aspect of the present invention there is provided a cleat assembly for compaction wheels of the type which are used on landfill compactors and which include a rim including an exterior surface, an interior surface, and a cleat-receiving aperture extending therethrough between the exterior and interior surfaces, the cleat assembly including a cleat and a spring clip for securing the cleat to the rim, the cleat including a ground-engaging portion, a lug portion extending from the ground-engaging portion, and a clip-receiving aperture extending through the lug portion, the cleat being mountable on the rim such that the ground-engaging portion projects from the exterior surface of the rim while the lug portion extends through the cleat-receiving aperture of the rim so that the clip-receiving aperture is situated adjacent the interior surface of the rim and lateral movement of the cleat relative to the rim is inhibited, the spring clip being adapted to secure the mounted cleat to the rim by engaging with the clip-receiving aperture and interacting with the rim and the cleat such that the ground-engaging portion of the cleat is pulled towards the rim.

The cleat assembly may include a sleeve for lining the cleat-receiving aperture. The sleeve may include a flange portion for abutting against the interior surface of the rim and a portion of the spring clip such that the spring clip forces the sleeve and ground-engaging portion of the cleat towards each other.

The clip-receiving aperture may include chamfered or rounded edges defining the openings thereof.

In a preferred form, the lug portion of the cleat has a single clip-receiving aperture extending therethrough. Alternatively, the lug portion of the cleat may have a plurality of clip-receiving apertures extending therethrough.

Preferably, the spring clip is generally U-shaped and includes a pair of arms which are adapted to extend through respective clip-receiving apertures of the cleat. The spring clip may be adapted to extend through only a single clip-receiving aperture of the cleat.

According to a further aspect of the present invention, there is provided a replacement part assembly for use in machinery, the replacement part assembly comprising:
 a replacement part for operative engagement with a fixed part; and
 a resilient fastener defining an apex to facilitate the operative engagement of the replacement part with the fixed part, at least one of the replacement part and the fixed part defining a cradle for receiving the apex of the resilient fastener.

According to a further aspect of the present invention, there is provided a compactor wheel assembly including:
 a compactor wheel;
 a cleat that can be operatively engaged with the compactor wheel and defining a cradle; and
 a resilient fastener that defines an apex and that can be engaged in the cradle to fasten the cleat with respect to the compactor wheel.

According to a further aspect of the present invention, there is provided a compactor wheel assembly including:
 a compactor wheel;
 an adaptor that can be fastened to the compactor wheel;
 a cleat that can be engaged with the adaptor; and
 a resilient fastener that defines an apex and that can be engaged with the adaptor and the cleat to fasten the cleat to the compactor wheel.

According to a further aspect of the present invention, there is provided a bucket assembly for earth moving equipment, the bucket assembly including:
 a bucket in which earth to be moved can be provided;
 one or more cleats that can be engaged with the bucket and each defining a cradle; and
 one or more resilient fasteners that each define an apex and that can each be engaged in a respective cradle to fasten the cleats to the compactor wheel.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 5a is a side sectional view of a compactor wheel assembly using the cleat of FIG. 2b, prior to the fastener being received in a cradle of the cleat.

FIG. 5b is a side view of the compactor wheel assembly of FIG. 5a, showing the fastener on the verge of being received within the cradle.

FIG. 5c is a side view of the compactor wheel assembly of FIG. 5a, showing the fastener received within the cradle.

FIG. 6b is a bottom plan view of FIG. 6a.

FIG. 10 is a perspective view of an excavator bucket assembly which includes a replacement part assembly in accordance with a third embodiment of the present invention.

FIG. 11 is a detailed side sectioned view of part of the excavator bucket assembly of FIG. 10.

FIG. 16 is a perspective view of an unassembled compactor assembly in accordance with a fifth embodiment of the present invention.

FIGS. 17a-17d show the sequential steps involved with assembling the compactor assembly of FIG. 16.

FIG. 18a is an end sectional view of the assembled compactor assembly of FIG. 16.

FIG. 18b is a side sectional view of the assembled compactor assembly of FIG. 16.

FIG. 23 is a plan view of a further embodiment of a fastener, in accordance with the invention, suitable for the compactor wheel assembly of FIG. 1, or the excavator bucket assembly of FIG. 10.

FIG. 24 is a three-dimensional view of the fastener of FIG. 23.

FIG. 25 is a front view of the fastener of FIG. 23.

FIG. 26 is a side view of the fastener of FIG. 23.

FIG. 27 is a plan view of yet a further embodiment of a fastener, in accordance with the invention, suitable for the compactor wheel assembly of FIG. 1, or the excavator bucket assembly of FIG. 10.

FIG. 28 is a three-dimensional view of the fastener of FIG. 27.

FIG. 29 is a front view of the fastener of FIG. 27.

FIG. 30 is a side view of the fastener of FIG. 27.

FIG. 31 is a partial sectional end elevation of a first portion of a compaction wheel according to a sixth embodiment of the present invention which includes a first type of cleat mounted on a rim.

FIG. 32 is a partial sectional side elevation of the portion of the compaction wheel illustrated in FIG. 31 which includes a spring clip securing the cleat to the rim.

FIG. 33 is a partial sectional end elevation of a second portion of the sixth embodiment of the compaction wheel which includes a further type of cleat mounted on the rim.

FIG. 34 is a partial sectional side elevation of the portion of the compaction wheel illustrated in FIG. 33 which includes a spring clip securing the cleat to the rim.

FIG. 39 is a perspective view of the sixth embodiment of the compaction wheel including the rim with a plurality of cleats mounted thereon.

FIG. 40 is a partial sectional end elevation of a portion of a compaction wheel according to an alternative embodiment of the present invention which includes a sleeve lining a cleat-receiving aperture of the rim.

FIG. 41 is a partial sectional side elevation of the portion of the compaction wheel illustrated in FIG. 40 which includes a spring clip securing the cleat and sleeve to the rim.

FIG. 42 is a perspective view of an alternative spring clip which may be used to secure a cleat to a rim in a manner which embodies the present invention.

DETAILED DESCRIPTION OF PREFERRED EMBODIMENTS

The present invention relates to a replacement part assembly which is suitable for use with a wide range of industrial machinery. For example, the replacement part assembly can be used with earth moving equipment such as compactors, graders, wheel drive loaders and excavators as described in detail below with respect to the first, second and third embodiments respectively. The replacement part assembly provides a simple and effective mechanism for readily replacing machinery parts, and includes a resilient fastener 24 which defines an apex 26 and a cradle 11 for receiving the apex 26.

Figure 1:
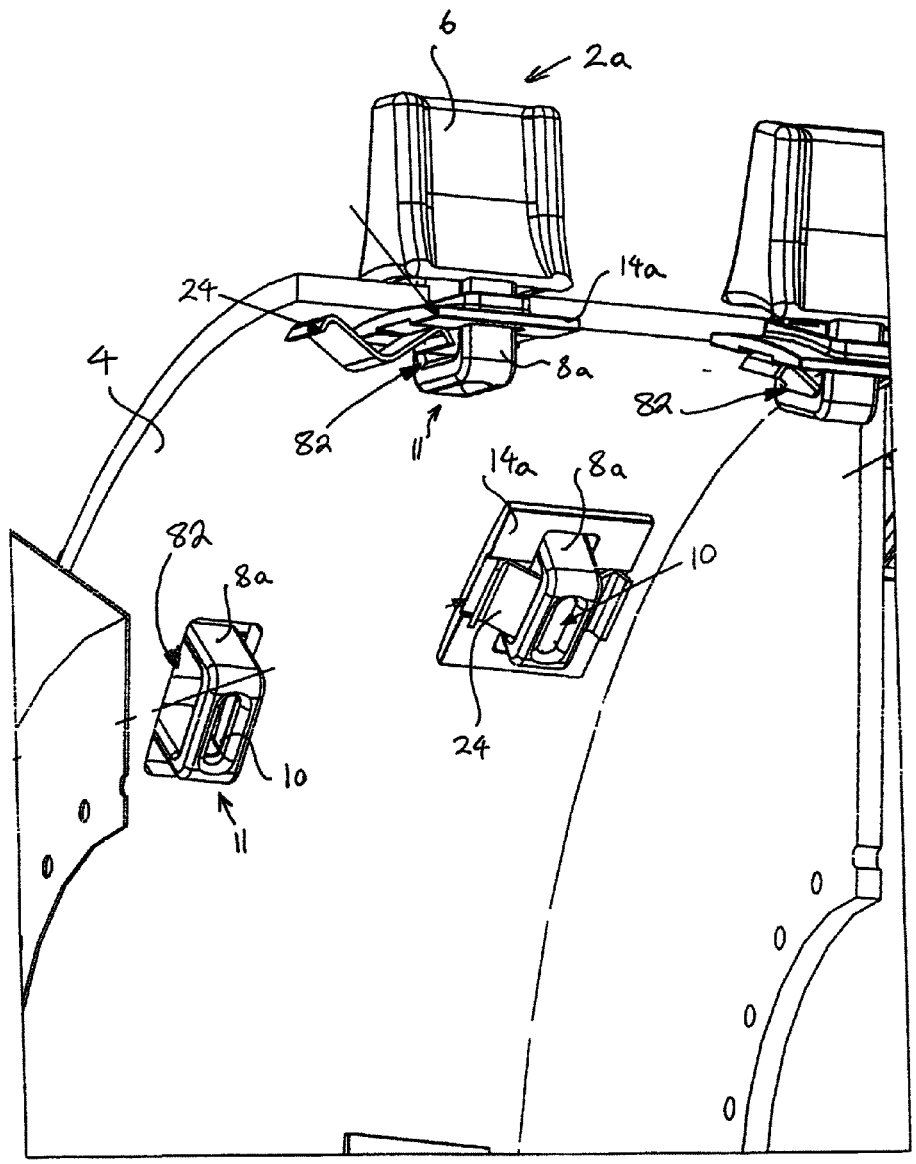
FIG. 1 is a sectional view of a compactor wheel assembly which includes a replacement part assembly in accordance with a first embodiment of the present invention.

A ground compactor wheel assembly is shown in FIG. 1 which includes a plurality of replacement part assemblies, one of which is shown in FIG. 1 according to a first embodiment of the present invention. The compactor wheel assembly includes a compactor wheel 4. Each replacement part assembly includes a ground-engaging cleat 2 releasably fastened to the compactor wheel 4. Each cleat 2 is fastened to the compactor wheel 4 using the spring fastener 24 of generally sinusoidal shape. In use, a respective sacrificial part 14 is located between the compactor wheel 4 and each cleat 2. Each component of the replacement part assembly is described in detail below.

Figures 2A, 2B:
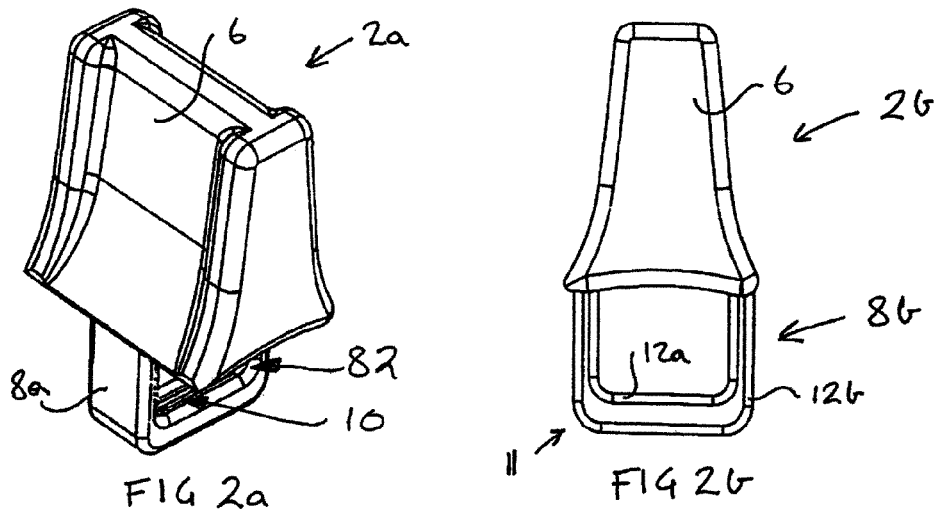
FIG. 2a is a perspective view of a cleat of the replacement part assembly of FIG. 1.
FIG. 2b is an end view of an alternative type of cleat for use with the compactor assembly of FIG. 1.

Referring to FIG. 2a, each cleat 2a is a replacement part and includes a tapered tip 6 for engaging the ground. Each cleat 2a further includes a tail 8a which extends from the tip 6 and is shaped to extend through a corresponding aperture 62 defined in the compactor wheel 4. As can best be seen in FIG. 1, the tail 8a of each cleat 2a defines a transversely extending passage 82. A cradle 11 of the tail 8a defines a slot 10 opening into the passage 82 and in which the apex 26 of the fastener 24 can be cradled.

Figure 7:
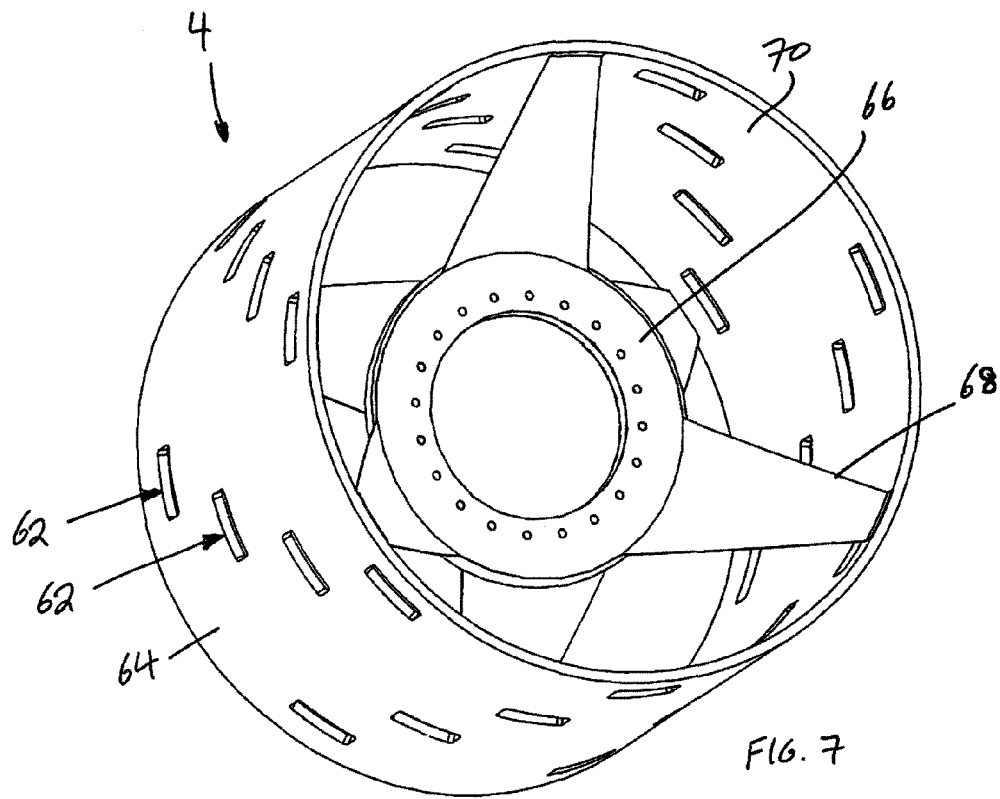
FIG. 7 is a three-dimensional view of a compactor wheel for use with the replacement part assembly of the invention.
Figure 8:
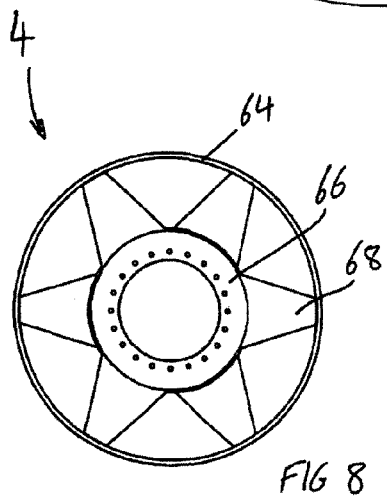
FIG. 8 is a side view of the compactor wheel of FIG. 7.
Figure 9:
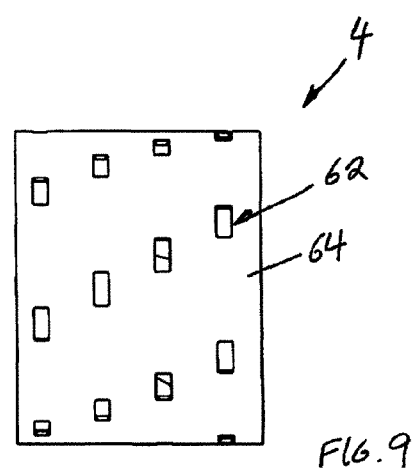
FIG. 9 is a front view of the compactor wheel of FIG. 7.
Figure 12:
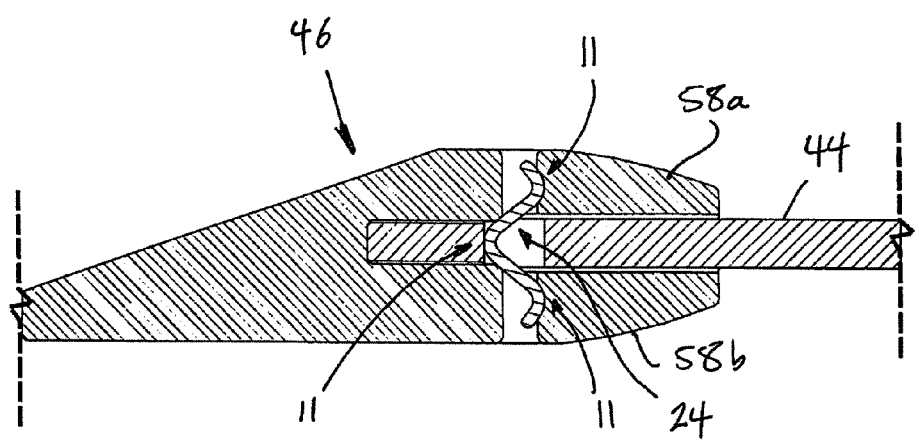
FIG. 12 is a side sectioned view of a spacer of a replacement part assembly in accordance with a fourth embodiment of the present invention fastened to the bucket of the bucket assembly of FIG. 10.

The wheel 4 is shown in further detail in FIGS. 7 to 9. The wheel 4 includes a rim 64 defined by a cylindrical wall. A plurality of the apertures 62 are defined in the rim 64. The apertures 62 are rectangular with major sides extending circumferentially with respect to the rim 64. This is significant as will be seen below.

The wheel 4 includes a hub 66 and a number of spokes 68 fastening the wheel 4 to the hub 66.

FIG. 2b shows an alternative type of cleat 2b which can be used with the fastener assembly. The tail 8b includes a pair of opposed and parallel arms 12a, 12c which together form the cradle 11 for receiving the apex 26 of the fastener 24.

Figure 3:
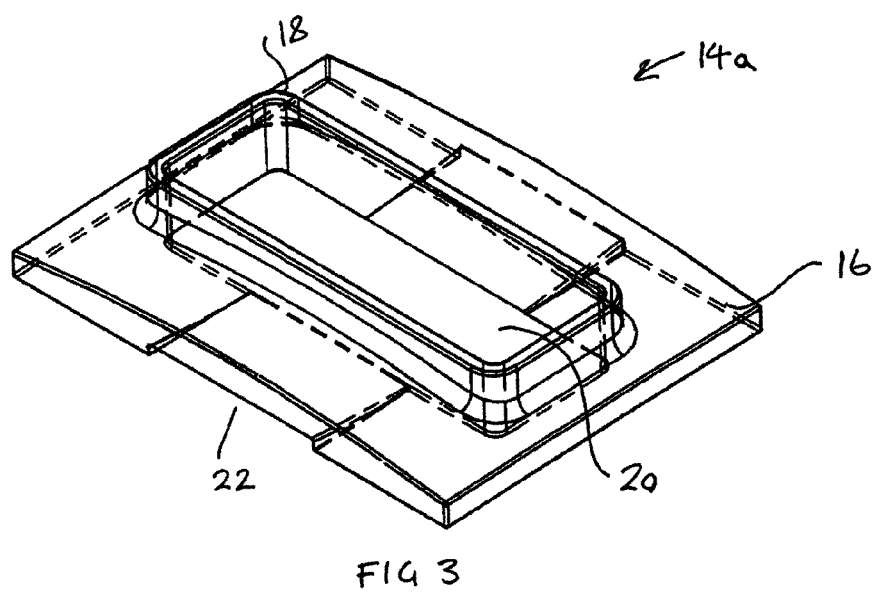
FIG. 3 is a perspective view of a sacrificial part of the replacement part assembly of FIG. 1.
Figure 4A:
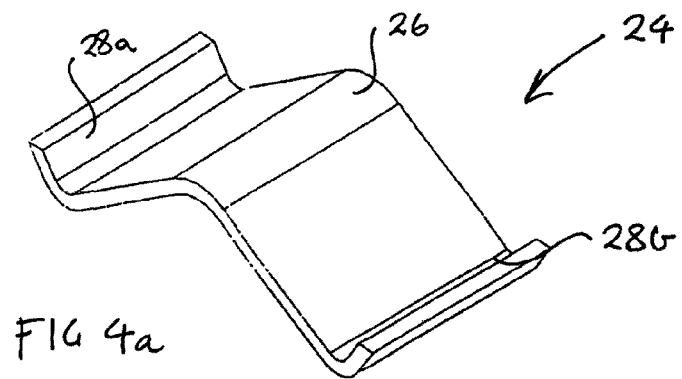
FIG. 4a is a perspective view of one embodiment of a fastener suitable for the replacement part assembly of FIG. 1.
Figure 4B:
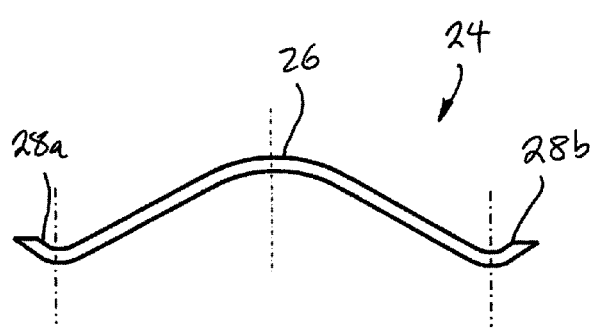
FIG. 4b is a side view of the fastener.
Figure 4C:
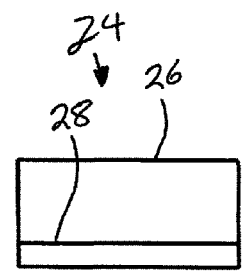
FIG. 4c is a front view of the fastener.
Figure 4D:
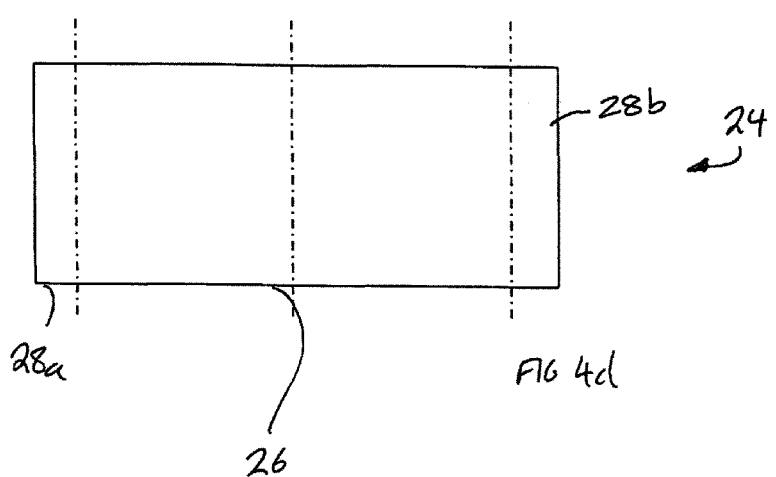
FIG. 4d is a plan view of the fastener.

As shown in FIG. 3, the sacrificial part 14a includes a rectangular base plate 16 that defines an aperture 20. In use, the tail 8 of the cleat 2 is received through the aperture 20. The sacrificial part 14a further includes a raised lip 18 which extends from a periphery of the aperture 20. In use, the lip 18 is snugly received in the aperture 62.

The base plate 16 of the sacrificial part 14a defines a channel 22 which extends across the aperture 20. The channel 22 acts as a guide and receives the fastener 24 in use. The channel 22 may be tapered on either side of the aperture 20.

Referring to FIGS. 4a to 4d, each resilient fastener 24 is formed by stamping and cutting spring plate material of the correct width in a single operation. The fastener 24 is of generally sinusoidal shape and has an arcuate apex 26 which extends toward a pair of upturned and arcuate feet 28a, 28b. The feet 28 are located on either side of the apex 26. In practice, an elongate strip of corrugated spring steel may be cut into sections to form a plurality of fasteners 24. It will be appreciated therefore that each foot 28 is simply a truncated trough or peak in such a strip of corrugated spring steel. As a result, fabrication of the fastener 24 is a process with a minimal number of steps, thereby minimizing a cost of the fastener 24.

The assembly of the replacement part assembly will now be described with reference to FIG. 5.

As shown in FIG. 5a, the sacrificial part 14a is positioned on an inner side 70 of the rim 64 with the aperture 20 aligned with the respective aperture 62 in the rim 64, and the lip 18 received snugly in the aperture 62 to locate the sacrificial part 14a against movement. Where necessary, the sacrificial part 14a is welded, preferably tack welded, to the inner side 70 of the rim 64.

The tail 8a of the cleat 2a is received snugly through the sacrificial part aperture 20. The fastener 24 is then slid in the channel 22 into the passage 82 in the direction indicated by arrow 72 in FIG. 5a.

Referring to FIG. 5b, a tool 30 (examples of which are described below) is fitted to a suitable apparatus (also described below) to push the fastener 24 into the passage 82. The arcuate surface of the apex 26 facilitates the sliding of the apex 26 into the slot 10 of the cradle 11. During assembly, the feet 28 of the fastener 24 move apart under tension as the apex 26 engages the tail 8a to permit the fastener 24 to move into the passage 82.

As shown in FIG. 5c, as the apex 26 is received in the cradle 11 the feet 28 move back towards one another under spring action. The fastener 24 is thus held in compression between the cradle 11 and the base plate 16.

Similarly, the fastener 24 can be removed from between the cradle 11 and the base plate 16 using the apparatus and tool 30. The cleat 2a can then be removed from the compactor wheel 4.

The sacrificial part 14a is selected of a material that facilitates wearing of the lip 18 rather than the periphery of the aperture 62. Thus, any movement of the tail 8 relative to the rim 64 results in a wearing of the lip 18, rather than an enlarging of the aperture 62, which would be undesirable. If such wearing takes place, it would be a simple matter to chisel off the sacrificial part 14a and to replace it, while maintaining the integrity of the rim 64.

It is important to note the orientation of the channel 22 with respect to a rotational axis of the wheel 4. The channel 22 is, in use, parallel to said axis of rotation. Thus, the fastener 24 is secured against excessive wearing movement as the wheel 4 rotates.

Figure 6A:
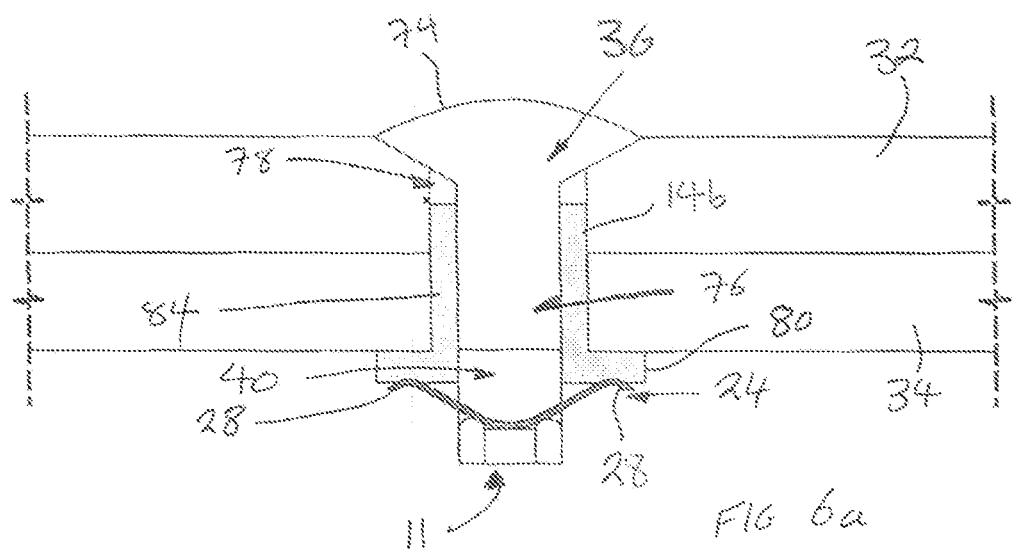
FIG. 6a is a side sectional view of a grader blade assembly which includes a replacement part assembly in accordance with a second embodiment of the present invention.
Figure 6B:
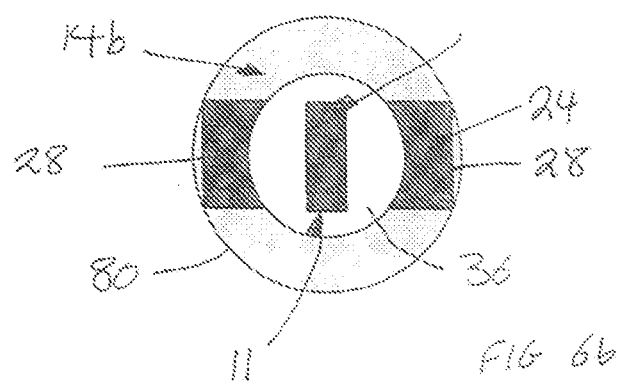

An earth grader blade assembly is shown in FIGS. 6a and 6b, which includes a replacement part assembly in accordance with a second embodiment of the present invention. With reference to FIGS. 1 to 5, like reference numerals refer to like parts, unless otherwise specified.

The replacement part assembly includes a blade 32 which can be releasably fastened to a moldboard 34 of a grader using the replacement part assembly.

The moldboard 34 and the blade 32 have a series of complementary openings, two of which, indicated at 76 and 78, are shown here.

The replacement part assembly includes a shank 36 having a head 74 at one end. The shank 36 is received through the aligned openings 76, 78. The opening 78 is counter-sunk to receive the head 74.

An opposite end of the shank 36 defines a transverse passage 40. Said opposite end also has the cradle 11 defining the slot 10 in which the apex 26 of the fastener 24 is cradled.

A sacrificial part 14b includes a sleeve 84 which is received in the openings 76, 78. A flange 80 extends from one end of the sleeve 78 and bears against an inner side of the moldboard 34. The fastener 24 is received in the passage 40 as described with reference to FIGS. 5a to 5c.

The sacrificial part 14b is of a material selected so that the sleeve 78 serves to wear sacrificially, thus protecting the moldboard 34 from damage. Thus, the sleeve 78 acts in the same manner as the lip 18 of the sacrificial part 14a described above.

A channel 40 for receiving the fastener 24 is defined in the flange 80.

FIG. 10 shows an earth moving machine bucket assembly which, in turn, includes a replacement part assembly in accordance with a third embodiment of the present invention. With reference to FIGS. 1 to 6, like reference numerals refer to like parts, unless otherwise specified. The bucket assembly includes a bucket 44 to which a plurality of teeth 42 and spacers 46 can be alternatively fastened in a row.

Each tooth 42 includes a pair of arms 54a, 54b for receiving a leading edge of the bucket 44. Each arm 54 defines a pair of apertures 50, 52 for each receiving a respective fastener 24. During fastening, the tooth 42 can be slid onto the bucket 44 so that the apertures 50, 52 in each arm 54 are in register with corresponding apertures 56 defined by the bucket 44. A pair of fasteners 24 can then be inserted into the apertures 50, 52 to fasten the tooth 42 to the bucket 44.

The spacers 46 are of similar construction to the teeth 42. Each spacer 46 includes a pair of parallel arms 58a, 58b which together define a slot 84 for receiving the bucket 44. Each arm 58 defines an aperture 60 which, when placed in register with a corresponding aperture 48 of the bucket 44, can receive a fastener 24 so as to fasten the spacer 46 to the bucket 44.

FIG. 11 shows a sectioned view through a tooth 42 which is fastened to the bucket 44 using a fastener 24. The bucket 44 and tooth 42 collectively define a recess which serves as a cradle 11 for receiving the apex 26 of the fastener 24. In addition, the tooth 42 further defines a pair of recesses, also serving as cradles 11, for each cradling a respective foot 28 of the fastener 24. These three cradles 11 serve to lock the fastener 24 in place so as to impede it from inadvertently becoming free. The fastener 24 is also compressed so as to hold it in place. In alternative embodiments, only a single cradle 11 need be defined for receiving either a foot 28 or the apex 26 of the fastener 24.

Figure 13:
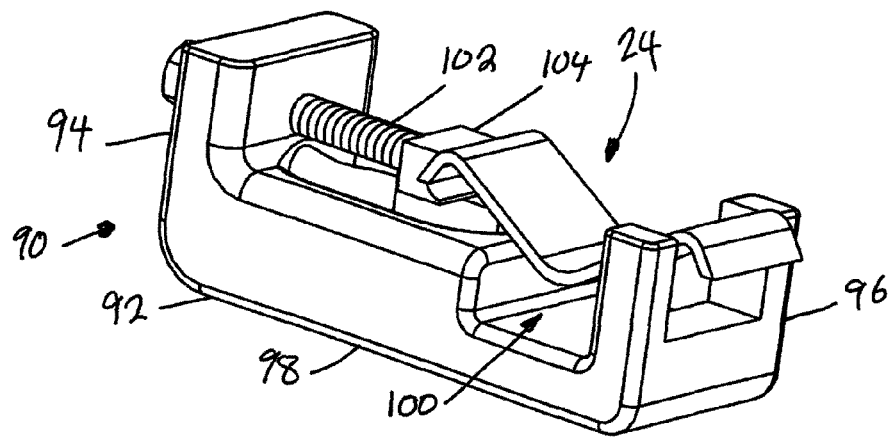
FIG. 13 is a three-dimensional view of a tool for fitting the fastener of FIGS. 4a to 4d to the compactor wheel of FIG. 7.

In FIG. 13, reference numeral 90 generally indicates an apparatus, in accordance with the invention, for inserting the fastener 24 into engagement with the tail 8 of the cleat 2, as shown in FIGS. 5a to 5c.

The apparatus 90 includes a body 92. The body 92 includes a proximal leg 94, a distal leg 96 and a cross piece 98 that interconnects the legs 94, 96. The body 92 is configured so that the legs 94, 96 can be positioned against the inner side 70 of the wheel 4. The cross piece 98 defines a recess 100 to accommodate the tail 8.

A power screw 102 is threaded through the proximal leg 94. A bearing member 104 is rotatably mounted on a distal end of the screw 102. The bearing member 104 is engageable with the fastener 24 so that, when the power screw 102 is rotated, the fastener 24 is driven into the passage 38.

Figure 15:
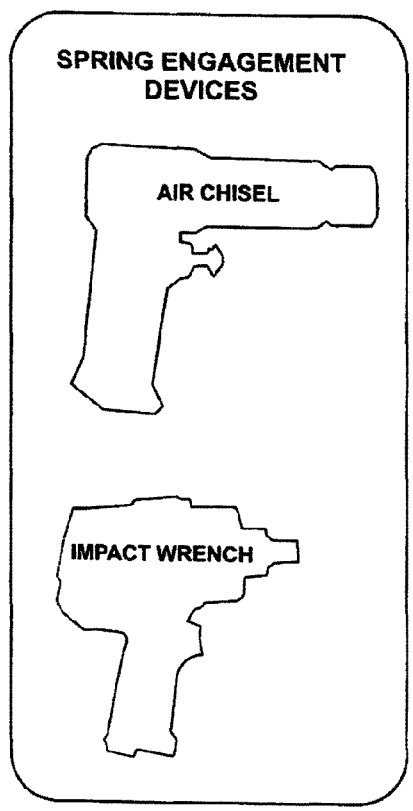
FIG. 15 shows two possible apparatus for operating the tools of FIGS. 13 and 14.

A proximal end 106 of the screw 102 is engageable with one of the air chisel and impact wrench as shown in FIG. 15. It will thus be appreciated that installment of the fastener 24 is rapid and convenient.

Figure 14:
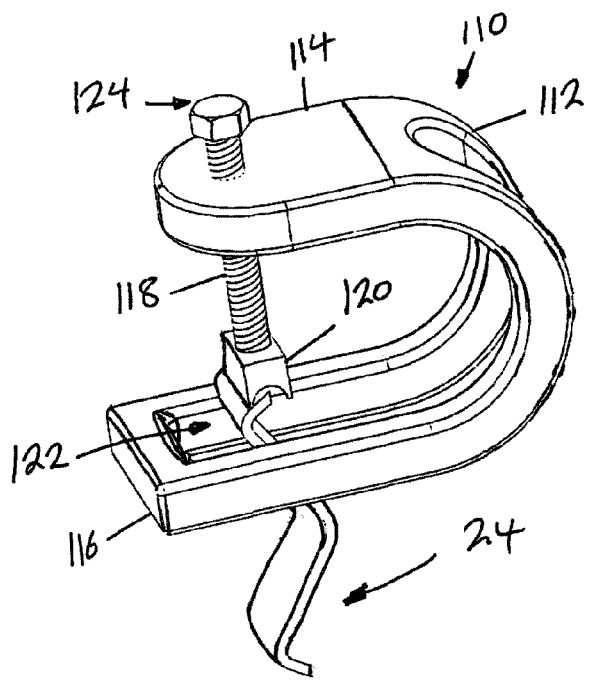
FIG. 14 is a three-dimensional view of a tool for fitting the fastener of FIGS. 4a to 4d to the bucket of FIG. 12.

In FIG. 14, reference numeral 110 generally indicates an apparatus, in accordance with the invention, suitable for inserting the fastener 24 into engagement with the leading edge of the bucket 44 and either of the teeth 42 or the spacers 46.

The apparatus 110 includes a generally U shaped body 112 with a proximal portion 114 and a distal portion 116.

A power screw 118 is threaded through the proximal portion 114. The power screw 118 has a bearing member 120 on a distal end. The bearing member 120 is engageable with the fastener 24.

The distal portion 116 has an opening 122 through which the fastener 24 can extend to permit engagement with the bearing member 120.

In use, the bearing member 120 is positioned against the tooth 42 or spacer 46 with the opening 122 in alignment with the relevant aperture 50, 52, 56. The fastener 24 is located as shown in FIG. 14 and the power screw 118 rotated to drive the fastener 24 into engagement with the relevant components.

A proximal end of the power screw 118 has a head 124 which is engageable with one of the air chisel and impact wrench as shown in FIG. 15. It will thus be appreciated that installment of the fastener 24 is rapid and convenient.

In some cases, the relevant components will simply be too large for use with the apparatus 90, 110. In such cases, a hydraulic ram and pump set, also known as a "portapower" can be used to provide the necessary force to position the fastener 24.

According to a fifth embodiment of the invention, there is provided a compactor wheel assembly as shown in FIG. 16. With reference to the preceding drawings, like reference numerals refer to like parts, unless otherwise specified The compactor wheel assembly includes the compactor wheel 4 and a generally tapered adaptor 130 for engaging the compactor wheel 4. A hollowed cleat 2c defining an inner recess 146 (FIG. 18) is also provided for engaging the adaptor 130 in a complementary fit.

Returning to FIG. 16, the compactor wheel assembly further includes the resilient fastener 24 for engaging the adaptor 130 and the cleat 2c so as to fasten the cleat 2c with respect to the compactor wheel 4.

The adaptor 130 includes a body 140 from which a head 141 extends. Both the body 140 and the head 141 are received in the recess 146 of the cleat 2c during fastening. A pair of doglegged and resilient legs 136a, 136b extend from the body 140 and, in use, extend through an aperture 144 defined in the compactor wheel 4. The adaptor 130 further includes a pair of feet 138a, 138b which each extend from a respective leg 136. The legs 136 include protruding knees 137 which, together with the feet 138, define troughs 142 for receiving the compactor wheel 4 during assembly. In use, the troughs 142 retain the adaptor 130 in engagement with the compactor wheel 4.

Referring to FIG. 18a, the recess 146 of cleat 2c is shaped to receive the adaptor 130. Referring to FIG. 18b, the cleat 2c also includes a pair of opposed flanks 132a, 132b which each define a respective aperture 134a, 134b for receiving the fastener 24. The floor of each aperture 134 is concaved to define a cradle 11 for receiving a foot 28 of the fastener 24. The base of the body 140 of the adaptor 130 is also concaved to define a cradle 11 for receiving the head 26 of the fastener 24.

Figure 17A:
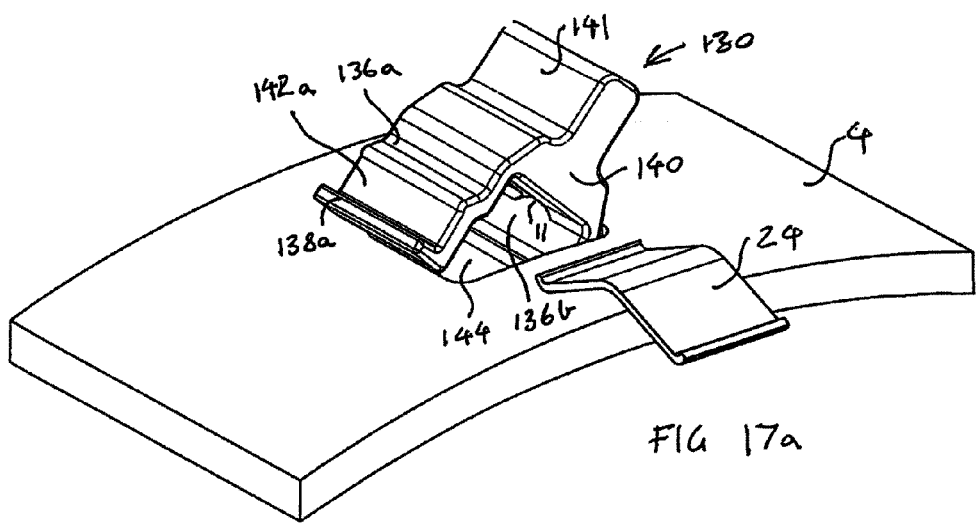
Figure 17B:
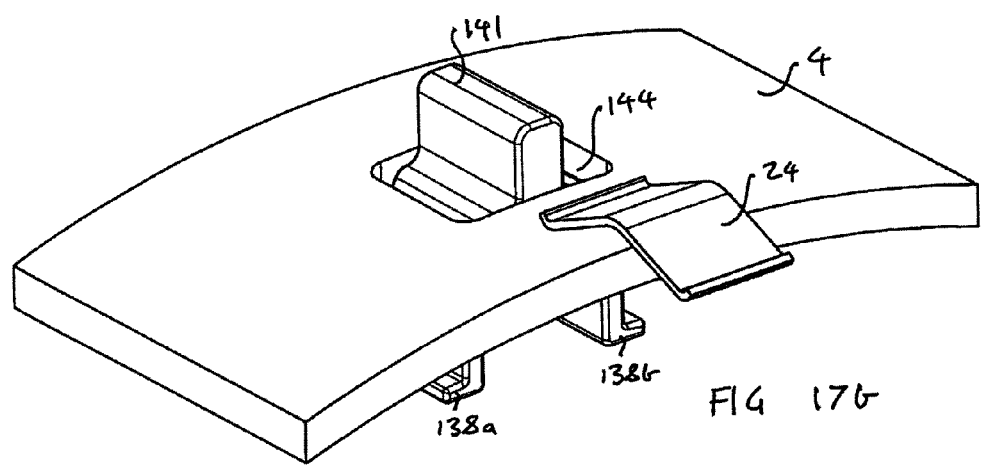

Referring to FIG. 17a, the adaptor 130 is manipulated so that the leg 136b is inserted through the aperture 144. The adaptor 130 is further manipulated so that the leg 138a is also inserted through the aperture as shown in FIG. 17b.

Figure 17C:
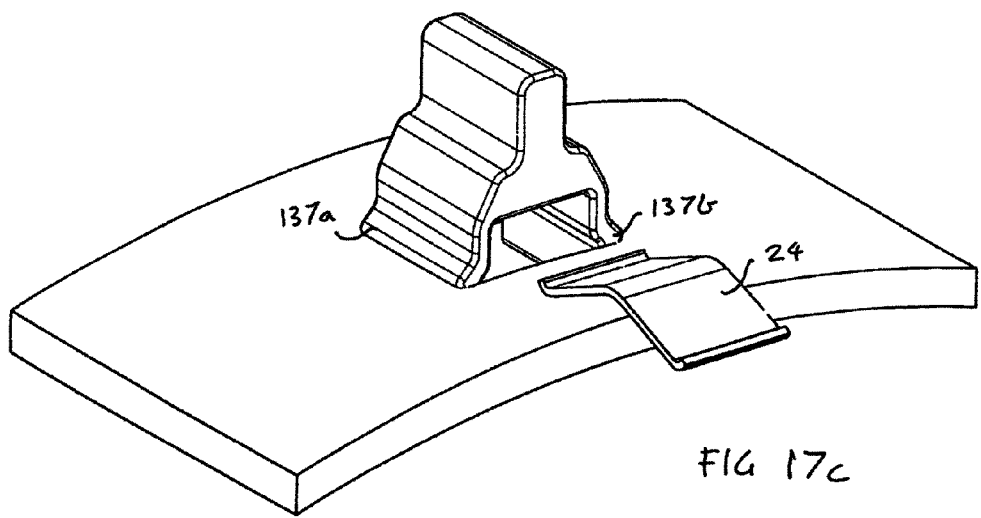

Referring to FIG. 17c, the user can then move the adaptor into the position shown such that the tapered shape of the adaptor 130 causes the compactor wheel 4 to compress the resilient legs 138a, 138b together. The knees 137 of the legs 136 pass through the aperture 144 and the legs 138 thereafter expand apart so that the compactor wheel is received within the trough 142 of each leg 136 defined between a corresponding knee 137 and foot 138 (FIG. 18a).

FIGS. 18a and 18b show the cleat 2c engaged with the adaptor 130 within its recess 146.

The tool 30 can be used to pass the fastener 24 through the aperture 134a in the fist flank 132a and into the second aperture 134b of the second flank 134a. The head 26 and feet 28 of the fastener 24 engage the concave cradles 11 defined in the adaptor 130 and flanks 132 of the cleat 2c respectively. The resilient fastener 24 is held in compression between the cleat 2c and the adaptor 130 so as to fasten the cleat 2c with respect to the compactor wheel 4 (which is fixed with respect to the adaptor 130).

The fifth embodiment has an advantage over the first embodiment whereby the cleat 2c can be fastened to the compactor wheel 4 from the outside of the compactor wheel 4. That is, the tool 30 need not engage the fastener 24 within the compactor wheel 4, and can instead be conveniently operated outside the compactor wheel 4. Given the number of cleats used with a compactor wheel or similar device, this results in a substantial saving in time.

Figure 19:
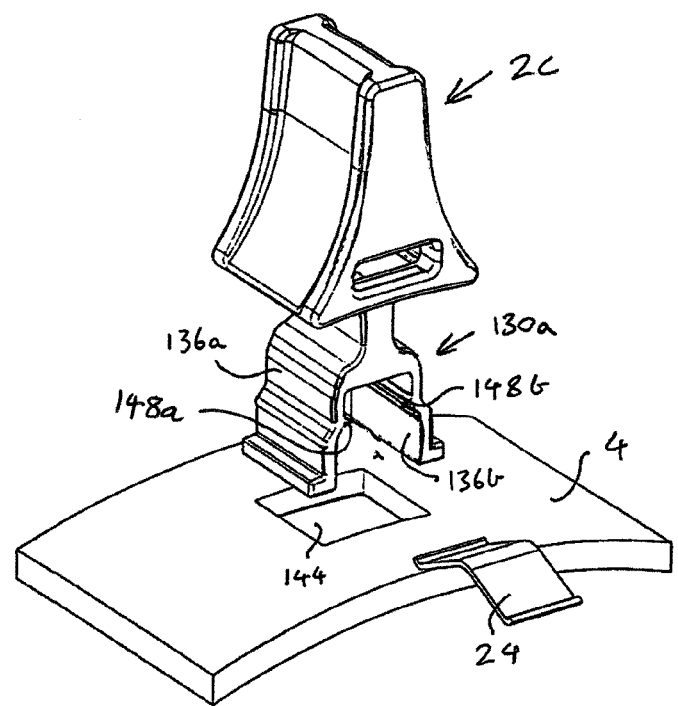
FIG. 19 is a perspective view of an unassembled compactor assembly in accordance with a fifth embodiment which includes an adaptor having a pair of guide ledges.

A further example of the fifth embodiment is shown in FIG. 19. The adaptor 130a includes a pair of opposed ledges 148 which each protrude from the inside of a respective leg 136. During assembly, the fastener 24 slides along the ledges 148 which together act as a guide, and impede the fastener 24 from falling through the aperture 144 and into the compactor wheel 4.

Figure 20:
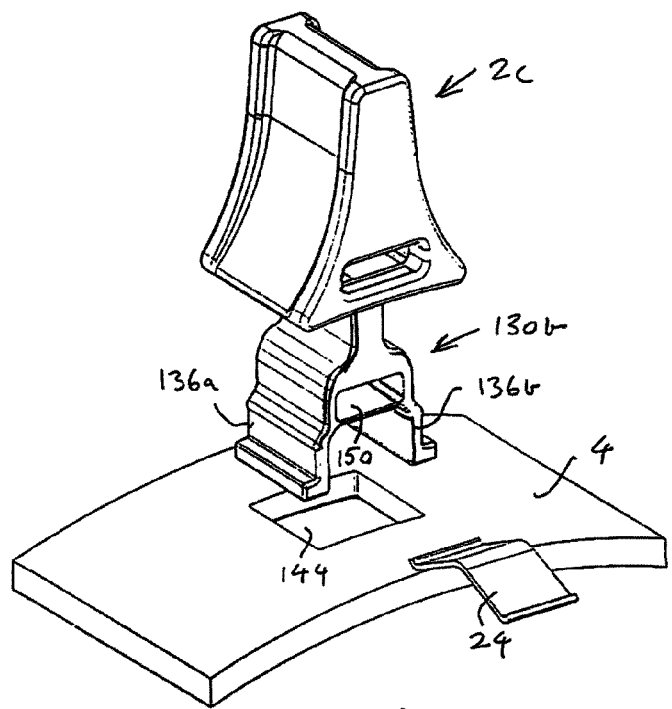
FIG. 20 is a perspective view of an unassembled compactor assembly in accordance with a fifth embodiment which includes an adaptor having a guide shelf.

Yet another example of the fifth embodiment is shown in FIG. 20. The adaptor 130b includes a guide shelf 150 for guiding the fastener 24 during assembly. The guide shelf 150 extends between the legs 136a, 136b and functions in a similar manner to the ledges 148 of FIG. 19.

Figure 21:
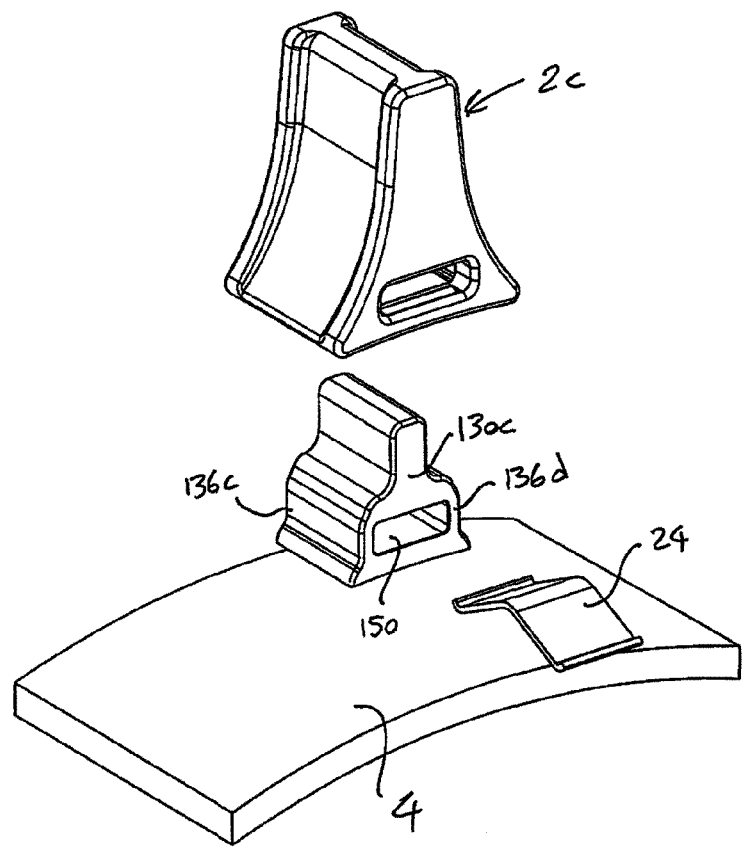
FIG. 21 is a perspective view of an unassembled compactor assembly in accordance with a fifth embodiment which includes a plurality of welds that engage an adaptor with a compactor wheel.
Figure 22A:
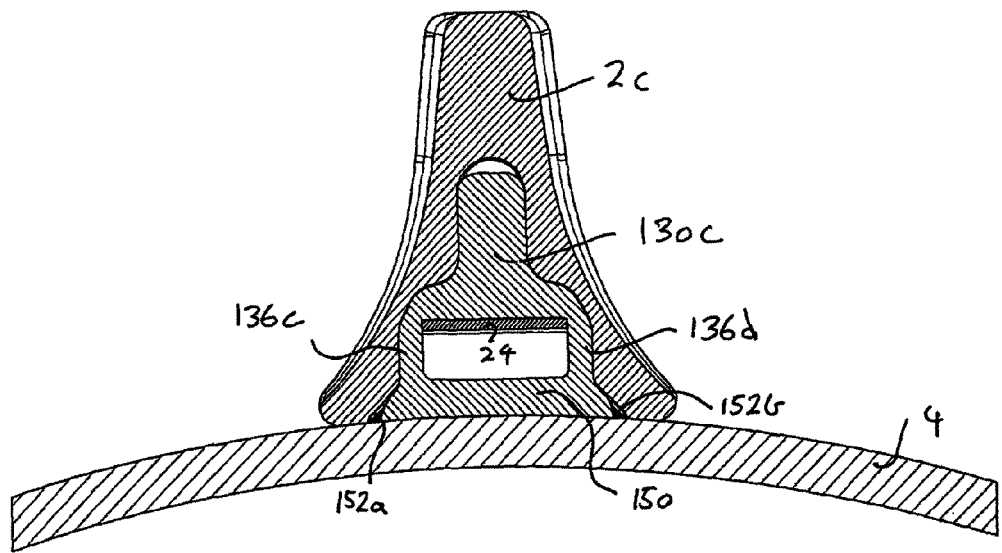
FIG. 22a is an end sectional view of the assembled compactor assembly of FIG. 21.
Figure 22B:
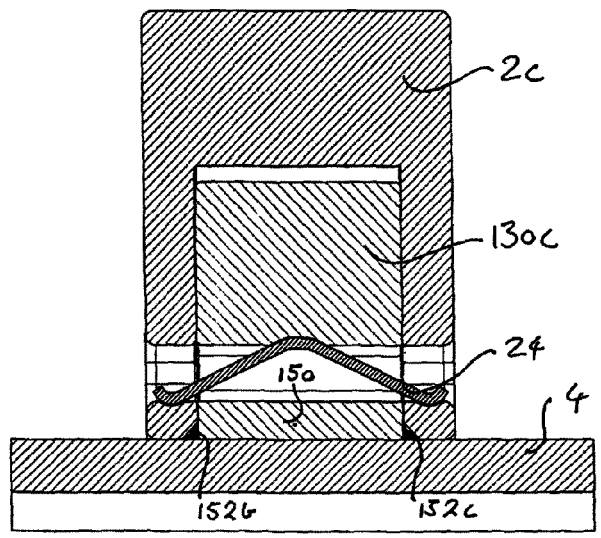
FIG. 22b is a side sectional view of the assembled compactor assembly of FIG. 21.

A further example of the fifth embodiment is shown in FIGS. 21, 22a and 22b. The adaptor 130c is welded to the compactor wheel 4 so that a quartet of welds 152 holds the adaptor 130c in engagement with the compactor wheel 4. Each weld 152 can be located at a respective corner of the base of the adaptor 130c or extend along an edge of the adaptor 130c. A guide shelf 150 extends between the legs 138a, 138b and functions in a similar manner to the ledges 148 of FIG. 19.

Figure 22D:
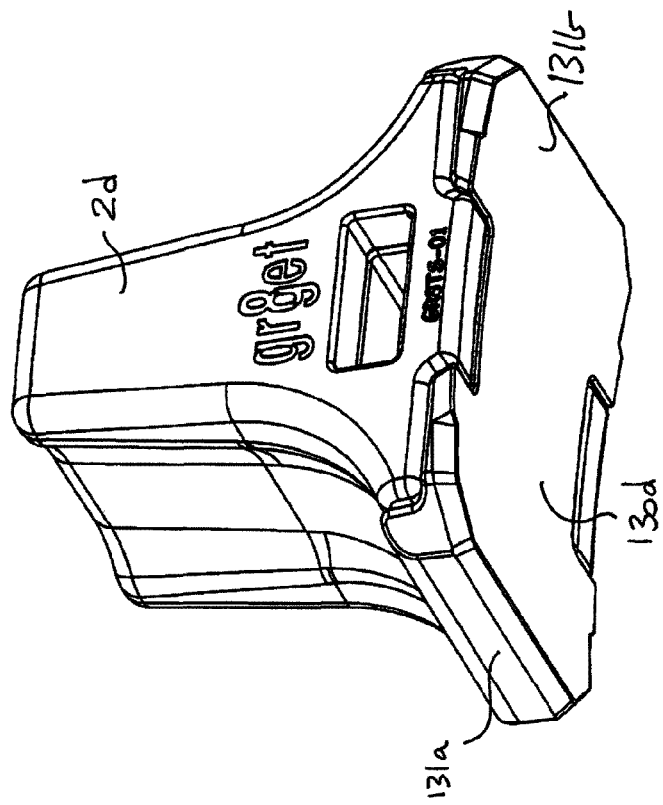
FIG. 22d is a bottom perspective view of the partially assembled compactor assembly of FIG. 22c.
Figure 22C:
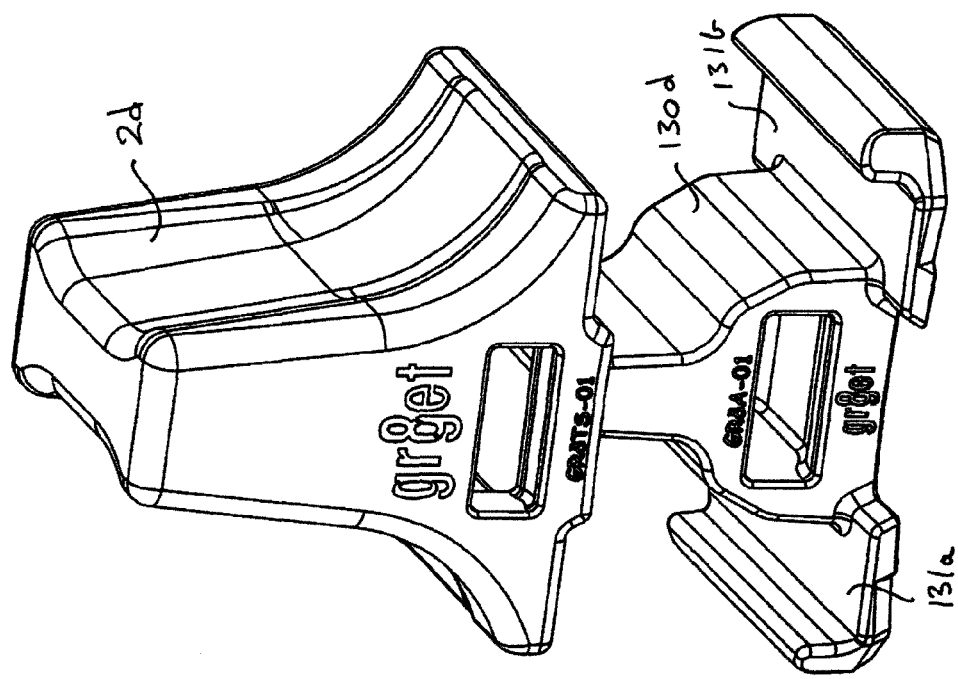
FIG. 22c is a top perspective view of an unassembled compactor assembly in accordance with a fifth embodiment which includes an adaptor having a pair of enlarged feet.

Another example of the fifth embodiment is shown in FIGS. 22c and 22d. The adaptor 130d is welded to the compactor wheel 4 so that welds hold the adaptor 130d in engagement with the compactor wheel 4. The adaptor 130d includes a pair of enlarged feet or pads 131 and defines a pair of opposed channels in which the cleat 2d can be received. The cleat 2d and adaptor 130d are complementarily shaped so as to snugly fit together.

In FIGS. 23 to 26 reference numeral 310 shows a further embodiment of a fastener, in accordance with the invention, suitable for use with the compactor wheel 4 or the bucket 44. With reference to the preceding Figures, like reference numerals refer to like parts, unless otherwise specified.

The fastener 310 is similar to the fastener 24 in that it has a sinusoidal profile. However, the fastener 310 is comprised of a base 312 that defines the profile and a reinforcing plate 314 fast with the base 312 over a central part of the base 312.

The reinforcing plate 314 forms part of the apex 26 thereby enhancing the resilience of the fastener 310. Since the reinforcing plate 314 only takes up a central portion of the base 312, the overall thickness of the fastener 310 can be kept to a minimum, thus reducing cost of materials, especially for mass production of the fastener 310.

The fastener 310 is the product of a stamping process. Thus, both the base 312 and the reinforcing plate 314 have corresponding holes 316 to facilitate retention during the stamping process. In use, these holes 316 are filled with a suitable material, such as a plastics material so that the ingress of dirt is inhibited.

A bead 318 extends from the reinforcing plate 314 at the apex 26. The bead 318 serves further to lock the fastener 310 in position in the manner described with reference to the fastener 24.

In FIGS. 27 to 30, reference numeral 320 generally indicates yet a further embodiment of a fastener 310, in accordance with the invention, suitable for use with the compactor wheel 4 or the bucket 44. With reference to the preceding FIGS. 23 to 26, like reference numerals refer to like parts, unless otherwise specified.

Instead of the reinforcing plate 314, the fastener 310 has a raised reinforcing formation 322 extending over the apex 26. The formation 322 bound a central region 325 on the base 312, so that that region extends over the apex 26 thereby enhancing the resilience of the plate 314.

FIGS. 31 and 32 illustrate a portion of a sixth embodiment of a compaction wheel 220 according to the present invention which may be employed with a landfill compactor. The compaction wheel 220 includes a rim 221 and a plurality of cleat assemblies 222 (note that only one complete cleat assembly 222 is illustrated in FIG. 32) secured thereto.

Rim 221 is constructed from a suitable material such as steel and is in the form of a hollow cylinder. The rim 221 includes an exterior surface 230, an interior surface 231, and an interior region 232 which is bordered by the interior surface 231.

Figure 37:
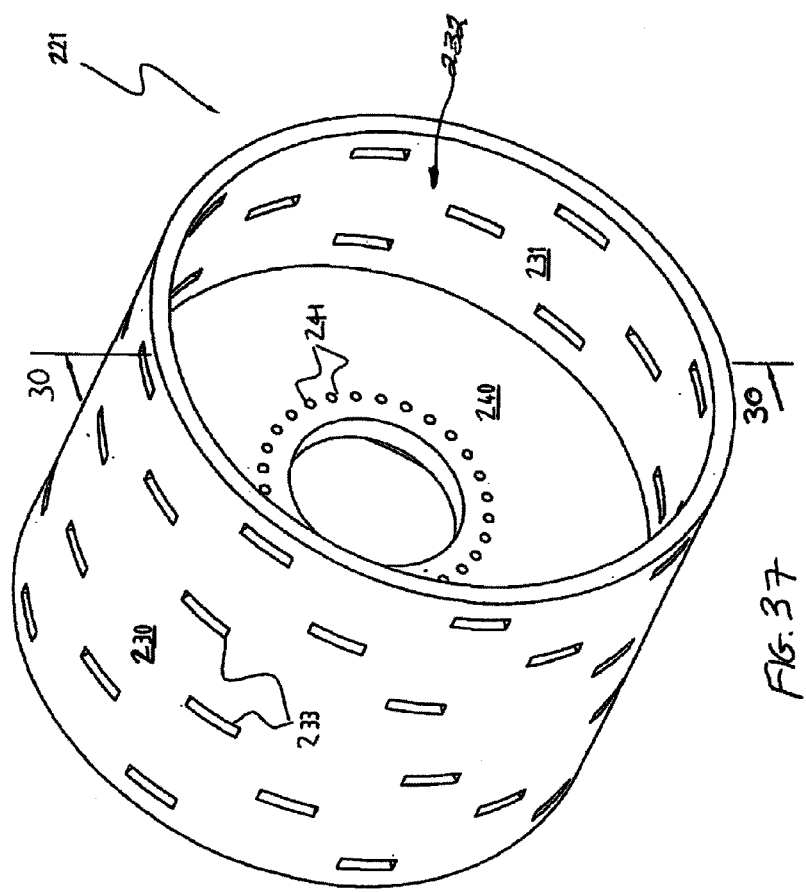
FIG. 37 is a perspective view of the rim of the sixth embodiment of the compaction wheel.
Figure 38:
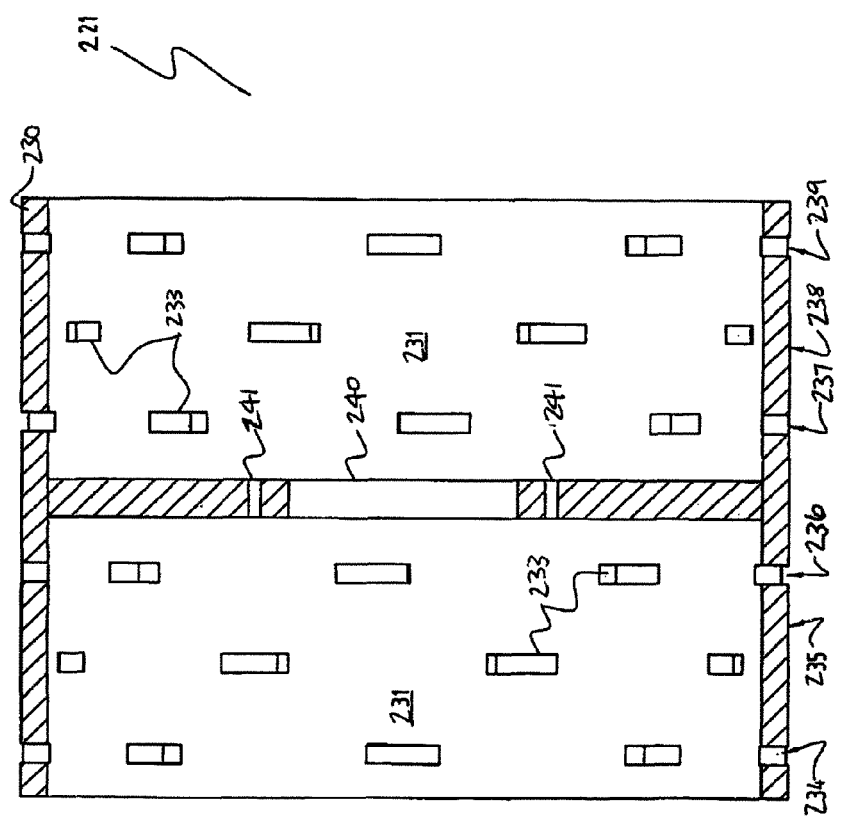
FIG. 38 is a sectional side elevation of the rim illustrated in FIG. 37 taken along the line 30-30.

Referring to FIGS. 37 and 38, a plurality of rectangular, cleat-receiving apertures 233 extends through the rim 221 between the exterior and interior surfaces 230, 231 thereof. The cleat-receiving apertures 233 are arranged into a plurality of bands 234 to 239 (see FIG. 38) which extend around the circumference of the rim 221 such that each band 234 to 239 includes a plurality of circumferentially spaced cleat-receiving apertures 233. Each cleat-receiving aperture 233 includes two orthogonal pairs of opposing sidewalls with the sidewalls of each pair being parallel to each other. The cleat-receiving apertures 233 are normally only formed in the rim 231 after the rim 221 has been formed into its basic cylindrical shape so as to prevent the apertures 233 from being distorted during the shaping process as would happen if they were otherwise formed prior to this stage of manufacture.

A mounting disc 240 is located in the interior region 232 of the rim 221 and is transversely arranged with respect to the longitudinal axis of the rim 221. The disc 240 is attached to the rim 221 by welding or other appropriate means such that the interior region 232 of the rim 221 is partitioned in two distinct regions. The mounting disc 240 is adapted to enable the wheel 220 to be secured to an axle of a landfill compactor. In particular, the mounting disc 240 includes a plurality of lug-receiving apertures 241 that are each adapted to receive an associated threaded lug which extends from an end of the axle of the landfill compactor so that the mounting disc 240 and, hence, the compaction wheel 220 can be securely bolted to the axle. The mounting disc also includes a large central aperture which is surrounded by the lug-receiving apertures 241 and which receives a hub of the axle.

Referring to FIGS. 31 and 32 again, the illustrated cleat assembly 222 includes a first type of cleat 250 and a spring clip 251 for securing the cleat 250 to the rim 221. Both the cleat 250 and the spring clip 251 are constructed from any suitable material such as steel.

Cleat 250 includes a ground-engaging portion 252, a lug portion 253 extending from the ground-engaging portion 252, and a pair of clip-receiving apertures 254, 255 extending transversely through the lug portion 253. Cleat 250 is mountable on the rim 221 such that the ground-engaging portion 252 projects from the exterior surface 230 of the rim 221 while the lug portion 253 extends through the cleat-receiving aperture 233 of the rim 221 so that the clip-receiving apertures 254, 255 are situated adjacent the interior surface 231 of the rim 221 and lateral movement of the cleat 250 relative to the rim 221 is inhibited.

The ground-engaging portion 252 includes a base portion 256 which is generally in the form of a rectangular prism having a curved underside which is adapted to rest against the curved exterior surface 230 of the rim 221. The ground-engaging portion 252 also has a pair of opposed flat trapezium-shaped sides 257, 258, a pair of opposed flat rectangular-shaped sides 259, 260 extending between the trapezium-shaped sides 257, 258, and a flat rectangular-shaped upper side 261. The cleat 250 is designed so that the trapezium-shaped sides 257, 258 thereof extend transversely with respect to the longitudinal axis of the rim 221 when the cleat 250 is mounted on the rim 221.

The lug portion 253 is substantially in the form of a rectangular prism and has dimensions which inhibit lateral movement of the lug portion 253 within the aperture 233 when the cleat 250 is mounted on the rim 221, but which allow the lug portion 253 to be readily inserted into and removed from the cleat-receiving aperture 233 when the cleat 250 is not secured to the rim 221.

Each of the clip-receiving apertures 254, 255 are slightly elongated and are oriented such that they are parallel with respect to each other and the longitudinal axis of the rim 221 when the cleat 250 is mounted thereon in the previously described manner.

Figure 35:
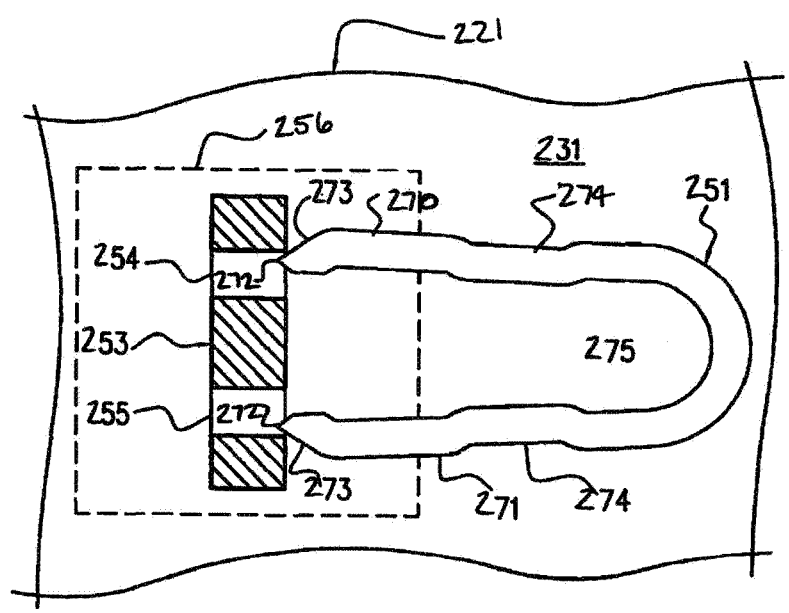
FIG. 35 is an interior view of a portion of the sixth embodiment of the compaction wheel which illustrates the lug portion of a cleat in a mounted condition on the rim prior to the cleat being secured to the rim with a spring clip.
Figure 36:
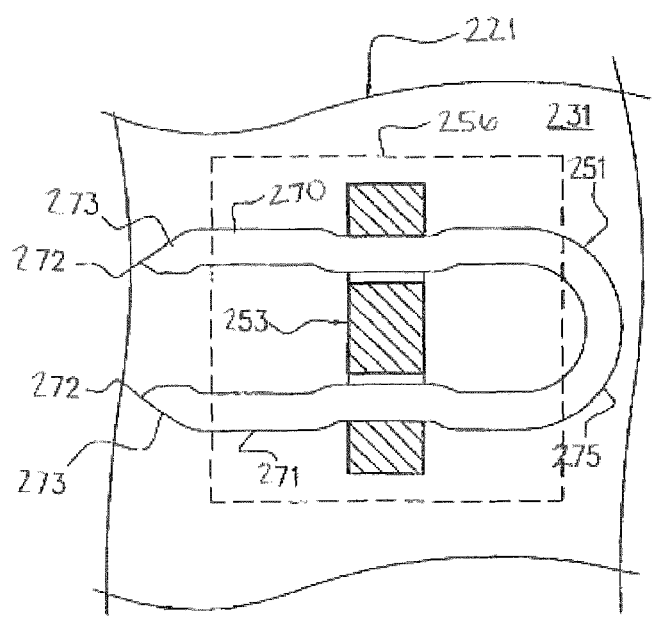
FIG. 36 is an interior view of the same portion of the compaction wheel illustrated in FIG. 35 which illustrates the lug portion of the mounted cleat after the cleat has been secured to the rim with the spring clip.

Referring to FIGS. 35 and 36, the spring clip 251 is a resilient and generally U-shaped clip which has a pair of arms 270, 271 that are each adapted to extend through a respective clip-receiving aperture 254, 255 of the cleat 250. Each arm 270, 271 has a pointed tip 272 and a tapered portion 273 which assists in guiding the arms 270, 271 into their respective clip-receiving apertures 254, 255. Each arm 270, 271 also has an indented portion 274 which is slightly longer than the length of the clip-receiving apertures 254, 255. The clip 251 is adapted to secure the mounted cleat 250 to the rim 221 such that each arm 270, 271 of the clip 251 extends through a respective clip-receiving aperture 254, 255 and such that the indented portions 274 of the arms 270, 271 are substantially located within their respective clip-receiving apertures 254, 255. In particular, the spring clip 251 is adapted so that when the arms 270, 271 extend through their respective clip-receiving apertures 254, 255 in the manner just described, each arm 270, 271 pushes against the interior surface of their respective clip-receiving aperture 254, 255 such that the arms 270, 271 push in opposite directions to each other. This pushing together with the presence of the indented portions 274 of the arms 270, 271 assists in preventing the spring clip 251 from working itself loose from the clip-receiving apertures 254, 255 and allowing the cleat 250 to fall off the rim 221.

To secure the mounted cleat 250 to the rim 221, the spring clip 251 is firstly positioned relative to the cleat 250 in the manner illustrated in FIG. 27. The arms 270, 271 are then inserted into the apertures 254, 255 by striking a bridging portion 275 of the spring clip 251 towards the lug portion 253 of the cleat 250 using a hammer or other suitable tool until the indented portions 274 coincide with the clip-receiving apertures 254, 255 as illustrated in FIG. 28.

Referring to FIG. 32, the spring clip 251 is adapted to secure the cleat 250 to the rim 221 by engaging with the clip-receiving apertures 254, 255 and interacting with the rim 221 and the cleat 250 such that the ground-engaging portion 252 of the cleat 250 is pulled towards the rim 221. In particular, the configuration of the spring clip 251 is such that rim-contacting portions 726 thereof contact the interior surface 231 of the rim 221, and the indented portions 274 of the arms 270, 271 pull against the cleat 250 such that the ground-engaging portion 252 thereof is pulled towards the rim 221.

While the spring clip 251 can be removed by simply reversing the above-described insertion procedure, it is usually easier to simply cut the bridging portion 275 of the spring clip 251 with an oxyacetylene torch or other suitable apparatus and to then remove the individual arms 270, 271 from the apertures 254, 255 of the cleat 250. Removal of the arms 270, 271 then allows the cleat 250 to be dismounted from the rim 221.

Referring to FIGS. 33 and 34, a further type of cleat 280 is illustrated mounted on the rim 221. For convenience, features of the cleat 280 that are similar or correspond to features of the cleat 250 have been referenced using the same reference numbers.

Cleat 280 differs from cleat 250 in that the ground-engaging portion 252 of cleat 280 has been modified. In particular, the trapezium-shaped sides 257, 258 of the ground-engaging portion 252 are parallel with respect to the longitudinal axis of the rim 221 when the cleat 280 is mounted on the rim 280.

FIG. 39 illustrates the compaction wheel 220 which includes a plurality of the cleats 250, 280 mounted on the rim 221. For clarity, the spring clips 251 which secure the cleats 250, 280 to the rim 221 have not been shown. From FIG. 39, the different orientation of the ground-engaging portions 252 of the cleats 250, 280 is apparent, as is the identical orientation of the lug portions 253 of the cleats 250, 280 relative to the rim 221 so that the clip-receiving apertures 254, 255 of the cleats 250, 280 are parallel with respect to the longitudinal axis of the rim 221.

The cleats 250, 280 are mounted on the rim 221 such that they form a plurality of helical patterns on the exterior surface 230 of the rim 221. The cleats 250, 280 of one such pattern have been referenced using the letter "A".

The compaction wheel 220 and cleat assembly 222 which embody the present invention provide a significant advantage over the prior art in that the design of the cleats 250, 280 combined with the way in which they are secured to the rim 221 with the spring clips 251 inhibits the cleats 250, 280 from becoming loose and damaging the rim 221.

The sixth embodiment is only one embodiment of the present invention and modifications obvious to those skilled in the art that can be made thereto without departing from the scope of the present invention. For example, referring to FIG. 32, the cleat assembly 222 may include a cast or forged steel sleeve 290 which lines the sidewalls of the cleat-receiving aperture 233 to further protect against undesirable rubbing between the cleat 250 and the rim 221 in the event that there is some play between the lug portion 253 of the cleat 250 and the aperture 233. Such rubbing is undesirable as it can result in premature wearing of the rim 221 which is often constructed from unhardened steel as opposed to the hardened steel from which the cleats are often constructed. The sleeve 290 may include a flange portion 291 which abuts against the interior surface 231 of the rim 221 to prevent the sleeve 290 from falling out of the aperture 233 when the cleat 250 and sleeve 290 are not secured to the rim 221 with the spring clip 251. The length of the sleeve 290 is such that there is a small gap between the sleeve 290 and the ground-engaging portion 252 of the cleat 250 when the sleeve 290 is inserted into the cleat-receiving aperture 233. In addition to abutting against the interior surface 231 of the rim 221, the flange portion 291 abuts against portions 276 of the spring clip 251 such that the spring clip 251 forces the sleeve 290 and ground-engaging portion 252 of the cleat 250 towards each other. A sleeve 290 which does or does not have the flange portion 291 may also be tack-welded to the rim 211 to prevent the sleeve 290 from falling off the rim 221. The tack-welds should be such that they can be readily cut or otherwise broken so that the sleeve 290 can be removed from the aperture 233.

Also, the edges which define the openings of the clip-receiving apertures 254, 255 may be chamfered, rounded, or otherwise adapted to prevent them from inadvertently damaging the spring 251 when the spring 251 is inserted into the apertures 254, 255. It is advantageous to do this as damaged springs 251 are susceptible to fail.

A further modification which can be made to the cleats 250, 280 described above is that they may have any number of clip-receiving apertures 254, 255 extending through their respective lug portions 253. For example, a single clip-receiving aperture or more than two such apertures may extend through the lug portions 253 of the cleats 250, 280. If a single clip-receiving aperture extends through the lug portion 253 of a cleat 250 or 280, then a spring clip such as the spring clip 300 illustrated in FIG. 42 may be used to secure the cleat to the rim 221. The spring clip 300 is essentially a broadened and flattened version of one of the arms 270, 271 of the spring clip 251 which was described above in connection with the sixth embodiment of the invention. Therefore, for convenience, features of the spring clip 300 that are similar or correspond to features of the spring clip 251 have been referenced using the same reference numbers. Apart from being broader and flatter than the arms 270, 271 of the spring clip 251, the indented portion 274 of the spring clip 300 is curved rather than linear. The curved indented portion 274 is able to be received within a similarly curved clip-receiving aperture. The spring clip 300 does not have any sharp edges so as to avoid damaging the cleat. The additional breadth of the spring clip 300 serves to prevent the clip 300 from rotating within the suitably dimensioned clip-receiving aperture of the cleat which receives the clip 300. Also, once the clip 300 has secured the cleat to the rim 221, the clip 300 has a profile which is essentially the same as the profile of the clip 251 as illustrated in FIG. 32.

The spring clip 300 can also be used instead of the spring clip 24, described with reference to FIGS. 1 to 30.

It will be appreciated that many other types of spring clips which are neither described nor contemplated here may be used to secure the cleats 250 or 280 to the rim 221, and that the springs clips 251, 300 which have been described here have been given by way of example only.

It should also be appreciated that the mounted cleats 250, 280 may be arranged on the rim 221 in a different manner to that described above in connection with the description of the sixth embodiment. For example, the cleats 250, 280 may be arranged into lines which extend across the exterior surface 230 of the rim 221 and which are parallel with the longitudinal axis of the rim 221. Alternatively, the cleats 250, 280 may be arranged to form chevron patterns on the exterior surface 230 of the rim 211.

A person skilled in the art will appreciate that many embodiments and variations can be made without departing from the ambit of the present invention.

The replacement part assembly of the present invention may be used in a wide range of machinery applications for releasably fastening a fixed part and a replacement part together. For example, the replacement part assembly of the second embodiment may be used to fasten a disc plough wheel to a rotating support. In fact, the replacement part assembly can be used with a wide variety of agricultural implements, such as ground planers, furrowers, scarifiers, and tips. Even more broadly, it will readily be understood that the replacement part assembly can be used with any agricultural, earthmoving, and soil-shifting apparatus where replacement of worn parts or components is necessary on a regular basis.

In the embodiments described above, the fastener 24 was of sinusoidal shape. A person skilled in the art will appreciate that the fastener may have many different shapes and could, for example, be a resilient sphere (i.e. having an arcuate head and tail). In another embodiment, the fastener may be of saw tooth shape having a head which includes a pointed apex.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

The invention claimed is:

1. A cleat assembly for a compactor wheel, the cleat assembly comprising
   an adaptor for fastening to the compactor wheel, the adaptor including pads that define a pair of opposed channels;
   a cleat that defines a recess in which the adaptor is receivable, the cleat being received in the channels; and
   a spring fastener, comprised of a strip of spring plate material, with opposed feet and at least one apex interposed between the feet, the adaptor and the cleat being shaped so that the spring can be received through both the cleat and the adaptor such that the spring fastener is held in compression between the cleat and the adaptor, with the feet bearing against the cleat and the at least one apex bearing against the adaptor to fasten the cleat to the adaptor, the cleat defining a pair of opposed apertures and the adaptor defining a guide formation, the apertures and the guide formation being configured to permit the spring fastener to be inserted into engagement with the cleat and the adaptor from one of the apertures.

2. A cleat assembly as claimed in claim 1, in which the cleat has a pair of opposed flanks in which the respective apertures are defined, each flank defining a bearing surface for the feet of the spring, and the adaptor having an internal bearing surface for the at least one apex.

3. A cleat assembly as claimed in claim 2, in which the bearing surfaces define cradles for the feet and the apex.

4. A cleat assembly as claimed in claim 2, in which the adaptor defines a passage that is dimensioned and oriented to align with the apertures of the cleats, the internal bearing surface being positioned in the passage.

5. A cleat assembly as claimed in claim 2, in which the flanks of the cleat are substantially planar and operatively aligned with a plane of rotation of the compactor wheel.

6. A cleat assembly as claimed in claim 5, in which the recess of the cleat has a tapered profile in the plane of rotation while the adaptor has a corresponding profile to permit the adaptor to nest within the cleat.

7. A cleat assembly as claimed in claim 1, in which the spring fastener has a generally sinusoidal profile, with the apex and the feet defined by a crest and intermediate troughs respectively.

8. A cleat assembly as claimed in claim 7, in which the spring fastener has a raised reinforcing formation extending over the apex.

9. A compactor wheel assembly that includes a number of cleat assemblies as claimed in claim 1.

* * * * *